United States Patent
Khoshnevisan et al.

(10) Patent No.: US 12,376,114 B2
(45) Date of Patent: Jul. 29, 2025

(54) FREQUENCY DIVISION MULTIPLEXING FOR UPLINK SHARED CHANNEL TRANSMISSIONS WITH INTERLACED RESOURCE BLOCK ALLOCATION

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 503 days.

(21) Appl. No.: 17/859,802

(22) Filed: Jul. 7, 2022

(65) Prior Publication Data

US 2024/0015746 A1    Jan. 11, 2024

(51) Int. Cl.
*H04W 72/21*    (2023.01)
*H04L 27/26*    (2006.01)
*H04W 72/0453*    (2023.01)

(52) U.S. Cl.
CPC ......... *H04W 72/21* (2023.01); *H04L 27/2605* (2013.01); *H04W 72/0453* (2013.01)

(58) Field of Classification Search
CPC ............. H04W 72/21; H04W 72/0453; H04W 72/1268; H04W 72/23; H04L 27/2605; H04L 5/001; H04L 5/0094
USPC ...................................................... 370/329
See application file for complete search history.

(56) References Cited

U.S. PATENT DOCUMENTS

| | | | |
|---|---|---|---|
| 2020/0383095 A1* | 12/2020 | Moon | H04L 5/001 |
| 2022/0086893 A1* | 3/2022 | Do | H04W 16/14 |
| 2023/0008100 A1* | 1/2023 | Yoshimura | H04W 72/23 |

FOREIGN PATENT DOCUMENTS

WO    WO-2021125361 A1    6/2021

OTHER PUBLICATIONS

Huawei., et al., "Maintenance on the Wideband Operation Procedures", 3GPP TSG RAN WG1 Meeting #101-e, R1-2003516, 3rd Generation Partnership Project, Mobile Competence Centre, 650, Route Des Lucioles, F-06921 Sophia-Antipolis Cedex, France, vol. RAN WG1, No. E-meeting May 25, 2020-Jun. 5, 2020, May 16, 2020, 7 Pages, XP052344823, Paragraph [0004], Figure 2.
International Search Report and Written Opinion—PCT/US2023/069017—ISA/EPO—Oct. 11, 2023.

* cited by examiner

*Primary Examiner* — Rownak Islam
(74) *Attorney, Agent, or Firm* — Holland & Hart LLP

(57) ABSTRACT

Methods, systems, and devices for wireless communications are described. A user equipment (UE) may receive control signaling scheduling a frequency division multiplexed (FDM) uplink shared channel message. The control signaling may include a resource allocation for a set of resource blocks (RBs), the resource allocation indicating an interlace assignment and an RB set assignment. The UE may allocate, according to a rule, the set of RBs into a first group of RBs and a second group of RBs based on the interlace assignment and the RB set assignment. The UE may transmit the FDM uplink shared channel message including the first group of RBs and the second group of RBs. The first group of RBs may be transmitted in accordance with a first set of transmission parameters and the second group of RBs may be transmitted in accordance with a second set of transmission parameters.

30 Claims, 18 Drawing Sheets

One RB

| 0 | Interlace 320-a |
| 1 | Interlace 320-b |
| 2 | Interlace 320-c |
| 3 | Interlace 320-d |
| 4 | Interlace 320-e |

FREQUENCY DIVISION MULTIPLEXING FOR UPLINK SHARED CHANNEL TRANSMISSIONS WITH INTERLACED RESOURCE BLOCK ALLOCATION

FIELD OF TECHNOLOGY

The following relates to wireless communications, including frequency division multiplexing for uplink shared channel transmissions with interlaced resource block allocation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a UE may receive control signaling indicating a resource allocation for communications, such as a frequency domain resource allocation (FDRA). The UE may transmit a message, such as an uplink message, using the resources indicated by the FDRA. In some cases, an uplink channel for the uplink message may be in an unlicensed radio frequency spectrum band, and the FDRA may indicate an interlace assignment, a resource block (RB) assignment, or both.

SUMMARY

The described techniques relate to improved methods, systems, devices, and apparatuses that support frequency division multiplexing (FDM) for uplink shared channel transmissions with interlaced resource block (RB) allocation. For example, the described techniques provide for a transmitting device, such as a user equipment (UE), to allocate a set of RBs scheduled for an uplink shared channel message into two RB groups for FDM transmission while maintaining interlace and RB set assignments associated with the set of RBs. The UE may receive control signaling, such as downlink control information (DCI), indicating a resource allocation for the set of RBs for the uplink shared channel message. The resource allocation may include an interlace assignment and an RB set assignment for the set of RBs. The UE may partition the set of RBs into a first RB group and a second RB group according to a rule, which may be based on the interlace assignment, the RB set assignment, or both. The UE may transmit the uplink shared channel message using FDM, such that the first RB group is transmitted according to a first set of transmission parameters and the second RB group is transmitted according to a second set of transmission parameters (e.g., different from the first set of transmission parameters).

In some examples, the rule may be based on a quantity of interlaces indicated in the interlace assignment. For example, the UE may allocate the set of RBs such that the first RB group includes a first subset of interlaces of the quantity of interlaces and the second RB group includes a second subset of interlaces of the quantity of interlaces. In other examples, the rule may be based on a quantity of RB sets indicated in the RB set assignment; the UE may allocate the set of RBs such that the first RB group includes a first subset of RB sets of the quantity of RB sets and the second RB group includes a second subset of RB sets of the quantity of RB sets. In some cases, the UE may be configured or preconfigured with the rule, or may receive signaling (e.g., control signaling) indicating the rule.

A method for wireless communications at a UE is described. The method may include receiving control signaling scheduling an FDM uplink shared channel message, the control signaling including a resource allocation for a set of multiple RBs, where the resource allocation includes an indication of an interlace assignment and an RB set assignment, allocating, according to a rule, the set of multiple RBs into a first group of RBs and a second group of RBs based on the interlace assignment and the RB set assignment, and transmitting the FDM uplink shared channel message including the first group of RBs and the second group of RBs based on the allocating, where the first group of RBs is transmitted in accordance with a first set of transmission parameters and the second group of RBs is transmitted in accordance with a second set of transmission parameters different from the first set of transmission parameters.

An apparatus for wireless communications at a UE is described. The apparatus may include a processor, memory coupled with the processor, and instructions stored in the memory. The instructions may be executable by the processor to cause the apparatus to receive control signaling scheduling an FDM uplink shared channel message, the control signaling including a resource allocation for a set of multiple RBs, where the resource allocation includes an indication of an interlace assignment and an RB set assignment, allocate, according to a rule, the set of multiple RBs into a first group of RBs and a second group of RBs based on the interlace assignment and the RB set assignment, and transmit the FDM uplink shared channel message including the first group of RBs and the second group of RBs based on the allocating, where the first group of RBs is transmitted in accordance with a first set of transmission parameters and the second group of RBs is transmitted in accordance with a second set of transmission parameters different from the first set of transmission parameters.

Another apparatus for wireless communications at a UE is described. The apparatus may include means for receiving control signaling scheduling an FDM uplink shared channel message, the control signaling including a resource allocation for a set of multiple RBs, where the resource allocation includes an indication of an interlace assignment and an RB set assignment, means for allocating, according to a rule, the set of multiple RBs into a first group of RBs and a second group of RBs based on the interlace assignment and the RB set assignment, and means for transmitting the FDM uplink shared channel message including the first group of RBs and the second group of RBs based on the allocating, where the first group of RBs is transmitted in accordance with a first set of transmission parameters and the second group of RBs is transmitted in accordance with a second set of transmission parameters different from the first set of transmission parameters.

A non-transitory computer-readable medium storing code for wireless communications at a UE is described. The code may include instructions executable by a processor to receive control signaling scheduling an FDM uplink shared channel message, the control signaling including a resource allocation for a set of multiple RBs, where the resource allocation includes an indication of an interlace assignment and an RB set assignment, allocate, according to a rule, the set of multiple RBs into a first group of RBs and a second group of RBs based on the interlace assignment and the RB set assignment, and transmit the FDM uplink shared channel message including the first group of RBs and the second group of RBs based on the allocating, where the first group of RBs is transmitted in accordance with a first set of transmission parameters and the second group of RBs is transmitted in accordance with a second set of transmission parameters different from the first set of transmission parameters.

In some examples of the method, apparatuses, and non-transitory computer-readable medium described herein, allocating according to the rule may include operations, features, means, or instructions for allocating the set of multiple RBs into the first group of RBs and the second group of RBs based on a quantity of interlaces indicated in the interlace assignment.

In some examples of the method, apparatuses, and non-transitory computer-readable medium described herein, the first group of RBs includes a first subset of interlaces of the quantity of interlaces and the second group of RBs includes a second subset of interlaces of the quantity of interlaces.

In some examples of the method, apparatuses, and non-transitory computer-readable medium described herein, both the first group of RBs and the second group of RBs may be associated with one or more RB sets indicated in the RB set assignment.

In some examples of the method, apparatuses, and non-transitory computer-readable medium described herein, allocating according to the rule may include operations, features, means, or instructions for allocating the set of multiple RBs into the first group of RBs and the second group of RBs based on a quantity of RB sets indicated in the RB set assignment.

In some examples of the method, apparatuses, and non-transitory computer-readable medium described herein, the first group of RBs includes a first subset of RB sets of the quantity of RB sets and the second group of RBs includes a second subset of RB sets of the quantity of RB sets.

In some examples of the method, apparatuses, and non-transitory computer-readable medium described herein, both the first group of RBs and the second group of RBs may be associated with one or more interlaces indicated in the interlace assignment.

In some examples of the method, apparatuses, and non-transitory computer-readable medium described herein, the first group of RBs includes a first RB set and a second RB set that may be adjacent in a frequency domain, the first group of RBs further including one or more RBs associated with a guard band between the first RB set and the second RB set based on the RB set assignment.

In some examples of the method, apparatuses, and non-transitory computer-readable medium described herein, the RB set assignment indicates one or more RBs associated with a guard band between a first RB set included in the first group of RBs and a second RB set included in the second group of RBs, the first RB set and the second RB set being adjacent in a frequency domain.

Some examples of the method, apparatuses, and non-transitory computer-readable medium described herein may further include operations, features, means, or instructions for dropping the one or more RBs associated with the guard band from the allocated set of multiple RBs based on the first group of RBs and the second group of RBs.

Some examples of the method, apparatuses, and non-transitory computer-readable medium described herein may further include operations, features, means, or instructions for allocating the one or more RBs associated with the guard band to the first group of RBs or the second group of RBs based on a total quantity of RBs of the first group of RBs and a total quantity of RBs of the second group of RBs.

Some examples of the method, apparatuses, and non-transitory computer-readable medium described herein may further include operations, features, means, or instructions for splitting the one or more RBs associated with the guard band between the first group of RBs and the second group of RBs.

In some examples of the method, apparatuses, and non-transitory computer-readable medium described herein, allocating according to the rule may include operations, features, means, or instructions for allocating the set of multiple RBs into the first group of RBs and the second group of RBs based on a quantity of interlaces indicated in the interlace assignment and a quantity of RB sets indicated in the RB set assignment.

Some examples of the method, apparatuses, and non-transitory computer-readable medium described herein may further include operations, features, means, or instructions for allocating a first subset of interlaces of the quantity of interlaces to the first group of RBs and a second subset of interlaces of the quantity of interlaces to the second group of RBs based on the quantity of interlaces being an even number.

Some examples of the method, apparatuses, and non-transitory computer-readable medium described herein may further include operations, features, means, or instructions for allocating a first subset of interlaces of the quantity of interlaces to the first group of RBs and a second subset of interlaces of the quantity of interlaces to the second group of RBs based on the quantity of interlaces being greater than the quantity of RB sets.

Some examples of the method, apparatuses, and non-transitory computer-readable medium described herein may further include operations, features, means, or instructions for allocating a first subset of RB sets of the quantity of RB sets to the first group of RBs and a second subset of RB sets of the quantity of RB sets to the second group of RBs based on the quantity of RB sets being an even number.

Some examples of the method, apparatuses, and non-transitory computer-readable medium described herein may further include operations, features, means, or instructions for allocating a first subset of RB sets of the quantity of RB sets to the first group of RBs and a second subset of RB sets of the quantity of RB sets to the second group of RBs based on the quantity of RB sets being greater than the quantity of interlaces.

Some examples of the method, apparatuses, and non-transitory computer-readable medium described herein may further include operations, features, means, or instructions for receiving second control signaling indicating the rule, where the allocating may be based on the second control signaling.

In some examples of the method, apparatuses, and non-transitory computer-readable medium described herein, the first group of RBs and the first set of transmission parameters may be associated with a first set of SRS resources, and the second group of RBs and the second set of transmission parameters may be associated with a second set of SRS resources.

In some examples of the method, apparatuses, and non-transitory computer-readable medium described herein, transmitting the FDM uplink shared channel message may include operations, features, means, or instructions for transmitting the first group of RBs and the second group of RBs according to a joint rate matching scheme.

In some examples of the method, apparatuses, and non-transitory computer-readable medium described herein, transmitting the FDM uplink shared channel message may include operations, features, means, or instructions for transmitting a first repetition of a transport block in the first group of RBs based on a first redundancy version and transmitting a second repetition of the transport block in the second group of RBs based on a second redundancy version.

A method for wireless communications is described. The method may include transmitting control signaling scheduling an FDM uplink shared channel message, the control signaling including a resource allocation for a set of multiple RBs, where the resource allocation includes an indication of an interlace assignment and an RB set assignment and receiving the FDM uplink shared channel message including a first group of RBs of the set of multiple RBs and a second group of RBs of the set of multiple RBs based on the interlace assignment, the RB set assignment, and a rule, where the first group of RBs is received in accordance with a first set of transmission parameters and the second group of RBs is received in accordance with a second set of transmission parameters different from the first set of transmission parameters.

An apparatus for wireless communications is described. The apparatus may include a processor, memory coupled with the processor, and instructions stored in the memory. The instructions may be executable by the processor to cause the apparatus to transmit control signaling scheduling an FDM uplink shared channel message, the control signaling including a resource allocation for a set of multiple RBs, where the resource allocation includes an indication of an interlace assignment and an RB set assignment and receive the FDM uplink shared channel message including a first group of RBs of the set of multiple RBs and a second group of RBs of the set of multiple RBs based on the interlace assignment, the RB set assignment, and a rule, where the first group of RBs is received in accordance with a first set of transmission parameters and the second group of RBs is received in accordance with a second set of transmission parameters different from the first set of transmission parameters.

Another apparatus for wireless communications is described. The apparatus may include means for transmitting control signaling scheduling an FDM uplink shared channel message, the control signaling including a resource allocation for a set of multiple RBs, where the resource allocation includes an indication of an interlace assignment and an RB set assignment and means for receiving the FDM uplink shared channel message including a first group of RBs of the set of multiple RBs and a second group of RBs of the set of multiple RBs based on the interlace assignment, the RB set assignment, and a rule, where the first group of RBs is received in accordance with a first set of transmission parameters and the second group of RBs is received in accordance with a second set of transmission parameters different from the first set of transmission parameters.

A non-transitory computer-readable medium storing code for wireless communications is described. The code may include instructions executable by a processor to transmit control signaling scheduling an FDM uplink shared channel message, the control signaling including a resource allocation for a set of multiple RBs, where the resource allocation includes an indication of an interlace assignment and an RB set assignment and receive the FDM uplink shared channel message including a first group of RBs of the set of multiple RBs and a second group of RBs of the set of multiple RBs based on the interlace assignment, the RB set assignment, and a rule, where the first group of RBs is received in accordance with a first set of transmission parameters and the second group of RBs is received in accordance with a second set of transmission parameters different from the first set of transmission parameters.

In some examples of the method, apparatuses, and non-transitory computer-readable medium described herein, the interlace assignment indicates a quantity of interlaces and the RB set assignment indicates a quantity of RB sets.

In some examples of the method, apparatuses, and non-transitory computer-readable medium described herein, the first group of RBs includes a first subset of interlaces of the quantity of interlaces and the second group of RBs includes a second subset of interlaces of the quantity of interlaces.

In some examples of the method, apparatuses, and non-transitory computer-readable medium described herein, both the first group of RBs and the second group of RBs may be associated with one or more RB sets indicated in the RB set assignment.

In some examples of the method, apparatuses, and non-transitory computer-readable medium described herein, the first group of RBs includes a first subset of RB sets of the quantity of RB sets and the second group of RBs includes a second subset of RB sets of the quantity of RB sets.

In some examples of the method, apparatuses, and non-transitory computer-readable medium described herein, both the first group of RBs and the second group of RBs may be associated with one or more interlaces indicated in the interlace assignment.

In some examples of the method, apparatuses, and non-transitory computer-readable medium described herein, the first group of RBs includes a first RB set and a second RB set that may be adjacent in a frequency domain, the first group of RBs further including one or more RBs associated with a guard band between the first RB set and the second RB set based on the RB set assignment.

In some examples of the method, apparatuses, and non-transitory computer-readable medium described herein, the RB set assignment indicates one or more RBs associated with a guard band between a first RB set included in the first group of RBs and a second RB set included in the second group of RBs, the first RB set and the second RB set being adjacent in a frequency domain.

In some examples of the method, apparatuses, and non-transitory computer-readable medium described herein, the first group of RBs or the second group of RBs includes the one or more RBs associated with the guard band based on a total quantity of RBs of the first group of RBs and a total quantity of RBs of the second group of RBs.

In some examples of the method, apparatuses, and non-transitory computer-readable medium described herein, the one or more RBs associated with the guard band may be split between the first group of RBs and the second group of RBs.

Some examples of the method, apparatuses, and non-transitory computer-readable medium described herein may further include operations, features, means, or instructions for transmitting second control signaling indicating the rule, where the FDM uplink shared channel message may be received in accordance with the rule.

In some examples of the method, apparatuses, and non-transitory computer-readable medium described herein, the first group of RBs and the first set of transmission parameters may be associated with a first set of SRS resources, and the second group of RBs and the second set of transmission parameters may be associated with a second set of SRS resources.

In some examples of the method, apparatuses, and non-transitory computer-readable medium described herein, receiving the FDM uplink shared channel message may include operations, features, means, or instructions for receiving the first group of RBs and the second group of RBs according to a joint rate matching scheme.

In some examples of the method, apparatuses, and non-transitory computer-readable medium described herein, receiving the FDM uplink shared channel message may include operations, features, means, or instructions for receiving a first repetition of a transport block in the first group of RBs based on a first redundancy version and receiving a second repetition of the transport block in the second group of RBs based on a second redundancy version.

DETAILED DESCRIPTION

Figure 1:
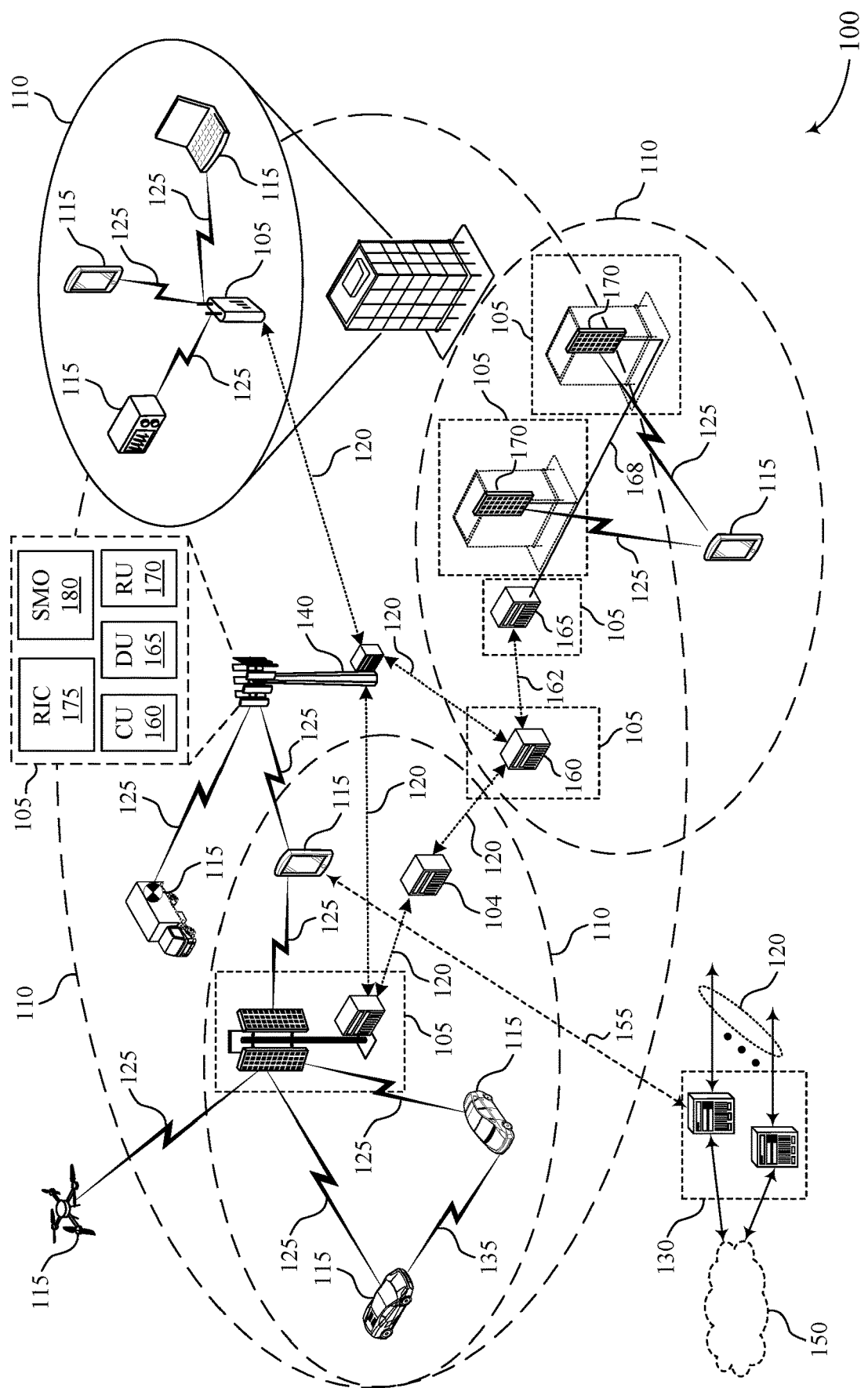
FIG. 1 illustrates an example of a wireless communications system that supports frequency division multiplexing (FDM) for uplink shared channel transmissions with interlaced resource block (RB) allocation in accordance with one or more aspects of the present disclosure.

In some wireless communication systems, a user equipment (UE) may communicate with a network via one or more transmission reception points (TRPs), such as in a multi-TRP system. The one or more TRPs may belong to different devices (e.g., network entities, UEs) or to a same device (e.g., a network entity, a UE). In some cases, a network entity may configure communications with a UE in the multi-TRP system according to a frequency division multiplexing (FDM) scheme, such that the UE may transmit or receive data from the TRPs using different beams (e.g., time-frequency resources in a spatial direction) and corresponding transmission parameters in different frequency resources over a given time interval. For example, for FDM uplink signaling, the UE may transmit a first portion of an uplink shared channel message to a first TRP using a first set of transmission parameters and a second portion of the uplink shared channel message to a second TRP using a second set of transmission parameters. The network entity may transmit downlink control information (DCI) to the UE that schedules the uplink shared channel message by indicating a set of resource blocks (RBs) and, in some cases, the sets of transmission parameters. The UE may partition (e.g., allocate or split) the set of RBs to the first and second portions of the uplink shared channel message, such that the first portion of the uplink message is associated with a first group of RBs of the set of RBs and the second portion of the uplink message is associated with a second group of RBs of the set of RBs.

However, some scenarios may lack support for FDM operations (e.g., FDM uplink signaling). For example, the UE and the network entity may operate in a shared radio frequency (RF) spectrum band, which may be referred to as an unlicensed RF spectrum band. A shared RF spectrum band may be shared by multiple technologies (e.g., Wi-Fi, New Radio (NR)), and devices of different technologies may operate according to some conditions to avoid collisions or interference with one another. For example, available resources for uplink transmissions in a shared RF spectrum may be constrained within one or more RB sets and may be allocated according to an interlaced allocation scheme. A DCI scheduling an uplink shared channel message in a shared RF spectrum may indicate a resource allocation (e.g., a set of RBs) including an RB set assignment and an interlace assignment. Conventional FDM uplink scheduling techniques may not account for resource allocations such as those used in shared RF spectrum bands, which may render shared RF spectrum communications incompatible with FDM. For example, if the UE receives an RB set assignment and an interlace assignment for the set of RBs, the UE may not know how to partition the set of RBs into the first and second portions of the uplink shared channel message for an FDM transmission.

Various aspects of the present disclosure support FDM for uplink transmissions with interlaced RB allocation and RB set allocation. A UE receiving control signaling indicating an interlace assignment and an RB set assignment for a set of RBs scheduled for an uplink transmission (e.g., an uplink shared channel transmission, such as a physical uplink shared channel (PUSCH) transmission) may partition (e.g., allocate) the set of RBs into a first RB group and a second RB group according to a rule. The UE may transmit the uplink transmission including the first RB group and the second RB group using FDM. For example, the UE may transmit the first RB group using a first set of transmission parameters and the second RB group using a second set of transmission parameters (e.g., different from the first set of transmission parameters).

The rule may be based on the interlace assignment, the RB set assignment, or both, and may enable the UE to partition the set of RBs while maintaining the interlace assignment and the RB set assignment. For example, the rule may be based on a quantity of interlaces indicated by the interlace assignment, such that the first RB group includes a first subset of the indicated interlaces and the second RB group includes a second subset of interlaces. Alternatively, the rule may be based on a quantity of RB sets indicated by the RB set assignment, and the first RB group may include a first subset of RB sets of the quantity of RB sets, while the second RB group may include a second subset of RB sets of the quantity of RB sets. In some examples, the UE may be configured with the rule to be used in the partitioning, or may receive signaling (e.g., control signaling) indicating the rule. Additionally, or alternatively, the UE may determine the rule. For example, the UE may determine or otherwise select a rule that provides a relatively even distribution of RBs across the first RB group and the second RB group.

Particular aspects of the subject matter described herein may be implemented to realize one or more advantages. By enabling FDM transmission for interlaced RB allocation, the described techniques may support improved system efficiency (e.g., relatively efficient resource utilization). Additionally, or alternatively, the described techniques may support improved reliability and throughput in wireless communications, such as shared RF spectrum band communications.

Aspects of the disclosure are initially described in the context of wireless communications systems. Aspects of the disclosure are then discussed with reference to resource block allocation schemes and a process flow. Aspects of the disclosure are further illustrated by and described with reference to apparatus diagrams, system diagrams, and flowcharts that relate to frequency division multiplexing for uplink shared channel transmissions with interlaced resource block allocation.

FIG. 1 illustrates an example of a wireless communications system 100 that supports frequency division multiplexing for uplink shared channel transmissions with interlaced resource block allocation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support frequency division multiplexing for uplink shared channel transmissions with interlaced resource block allocation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may be further divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

To support multiplexing techniques, such as TDM, FDM, and the like, a network entity 105 in the wireless communications system 100 may transmit, to a UE 115, control signaling that schedules resources for a multiplexed uplink transmission to be transmitted by the UE 115. For example, in TDM operations, the network entity 105 may transmit DCI scheduling two sets of repetitions of a transport block (TB) of an uplink shared channel message (e.g., a PUSCH message). Here, each set of repetitions may be associated with a respective set of transmission parameters, such as a transmit beam (e.g., spatial relation, transmission configuration indicator (TCI) state, or the like), transmit power (or other power control parameter(s)), or precoder, among other examples. In some cases, the UE 115 may transmit each set of repetitions of the PUSCH message to a respective TRP.

In some examples, each set of transmission parameters may correspond to a respective sounding reference signal (SRS) resource set. The UE 115 may transmit one or more SRSs on corresponding SRS resource sets and using corresponding transmission parameters. The network entity 105 may estimate a channel between the network entity 105 and the UE 115 based on receiving the SRS(s), and may select one or more SRSs and associated SRS resource sets and transmission parameters that provide an appropriate signal quality for communications over the channel. When scheduling a subsequent uplink message (e.g., the PUSCH message), the network entity 105 may indicate the selected SRS resource set(s) to the UE 115. For example, the network entity 105 may indicate one or more SRS resource set indicators and one or more SRS resource indicators (SRIs) as part of DCI scheduling the PUSCH message. In some examples, the DCI may additionally indicate one or more transmit precoder matrix indicators (TPMIs) to be used for the PUSCH message. The UE 115 may determine transmission parameters to use for each set of repetitions of the PUSCH message based on the SRI(s) and the TPMI(s), e.g., based on transmission parameters used to transmit the SRS on the indicated SRS resource set. For example, the SRS resource set indicator field of the DCI scheduling the PUSCH message may indicate two SRS resource sets, and two or more SRI fields of the DCI may each indicate one or more SRS resources from the corresponding SRS resource set. The UE 115 may transmit a first set of repetitions of an uplink message using a first set of transmission parameters associated with a first indicated SRS resource set (and, in some examples, associated with the one or more indicated SRS resources from the first SRS resource set), and may transmit a second set of repetitions of the uplink message using a second set of transmission parameters associated with a second indicated SRS resource set (and, in some examples, as well as associated with the one or more indicated SRS resources from the second SRS resource set).

For an FDM uplink transmission, such as a PUSCH message, the network entity 105 may transmit DCI scheduling a set of RBs allocated for the PUSCH message. The UE 115 may partition or otherwise allocate the set of RBs into two subsets of RBs to be transmitted using FDM. The DCI may further indicate a respective SRS resource set (e.g., via SRS resource set indicator field(s)) corresponding to each subset of RBs. In some examples, the DCI may additionally indicate a respective TPMI associated with each subset of RBs. The UE 115 may transmit the first subset of RBs from a first antenna panel using a first beam and a first set of transmission parameters (e.g., based on the first indicated SRS resource set, SRI, and TPMI). The UE 115 may transmit the second subset of RBs from a second antenna panel using a second beam and a second set of transmission parameters (e.g., based on the second indicated SRS resource set, SRI, and TPMI).

In some cases, the UE 115 may transmit an FDM uplink message with or without repetition. For example, in a first FDM scheme, the UE 115 may apply joint rate matching to the first and second subsets of RBs, such that the first and second subsets of RBs are both associated with a same redundancy version. In this example, the UE 115 may transmit the PUSCH message without repetition. Alternatively, repetition may be achieved via a second FDM scheme, where the UE 115 applies separate rate matching schemes to respective subsets of RBs. Here, the first subset of RBs may be associated with a first redundancy version and the second subset of RBs may be associated with a second redundancy version.

In general, the network entity 105 may schedule an uplink transmission from the UE 115 by sending the UE 115 an uplink grant, which signals to the UE 115 that the UE 115 may transmit uplink data on configured or scheduled resources (e.g., indicated by the uplink grant). For example, the UE 115 may receive DCI indicating a resource allocation (e.g., a time domain resource allocation (TRDA), a frequency domain resource allocation (FDRA), or the like) for a set of RBs scheduled for an uplink transmission from the UE 115. The UE 115 may transmit the uplink transmission using the set of RBs indicated by the resource allocation. In some examples, such as for communications in a shared (e.g., unlicensed) frequency band, the DCI may include, as part of the resource allocation, an RB set assignment and an interlace assignment. That is, the set of RBs scheduled for the uplink transmission may be associated with one or more interlaces and may be allocated within one or more RB sets. Such resource allocation may be referred to as type 2 resource allocation.

The techniques described herein support FDM operations for uplink messages scheduled via type 2 resource allocation, e.g., associated with interlaced RB allocation (and, in some cases, RB set allocation). A UE 115 receiving control signaling (e.g., DCI) indicating an interlace assignment and an RB set assignment for a set of RBs scheduled for an uplink transmission (e.g., an uplink shared channel transmission, such as a PUSCH transmission) may partition (e.g., allocate) the set of RBs into a first RB group and a second RB group according to a rule. The rule may be based on the interlace assignment, the RB set assignment, or both, and may enable the UE 115 to partition the set of RBs while maintaining the interlace assignment and the RB set assignment. For example, the rule may be based on a quantity of interlaces indicated by the interlace assignment, such that the first RB group includes a first subset of the indicated interlaces and the second RB group includes a second subset of interlaces. Alternatively, the rule may be based on a quantity of RB sets indicated by the RB set assignment, and the first RB group may include a first subset of RB sets of the quantity of RB sets, while the second RB group may include a second subset of RB sets of the quantity of RB sets.

The UE 115 may transmit the uplink transmission including the first RB group and the second RB group using FDM. For example, the UE 115 may transmit the first RB group using a first set of transmission parameters and the second RB group using a second set of transmission parameters (e.g., different from the first set of transmission parameters). In some cases, the UE 115 may transmit the first RB group to a first TRP and may transmit the second RB group to a second TRP.

Figure 2:
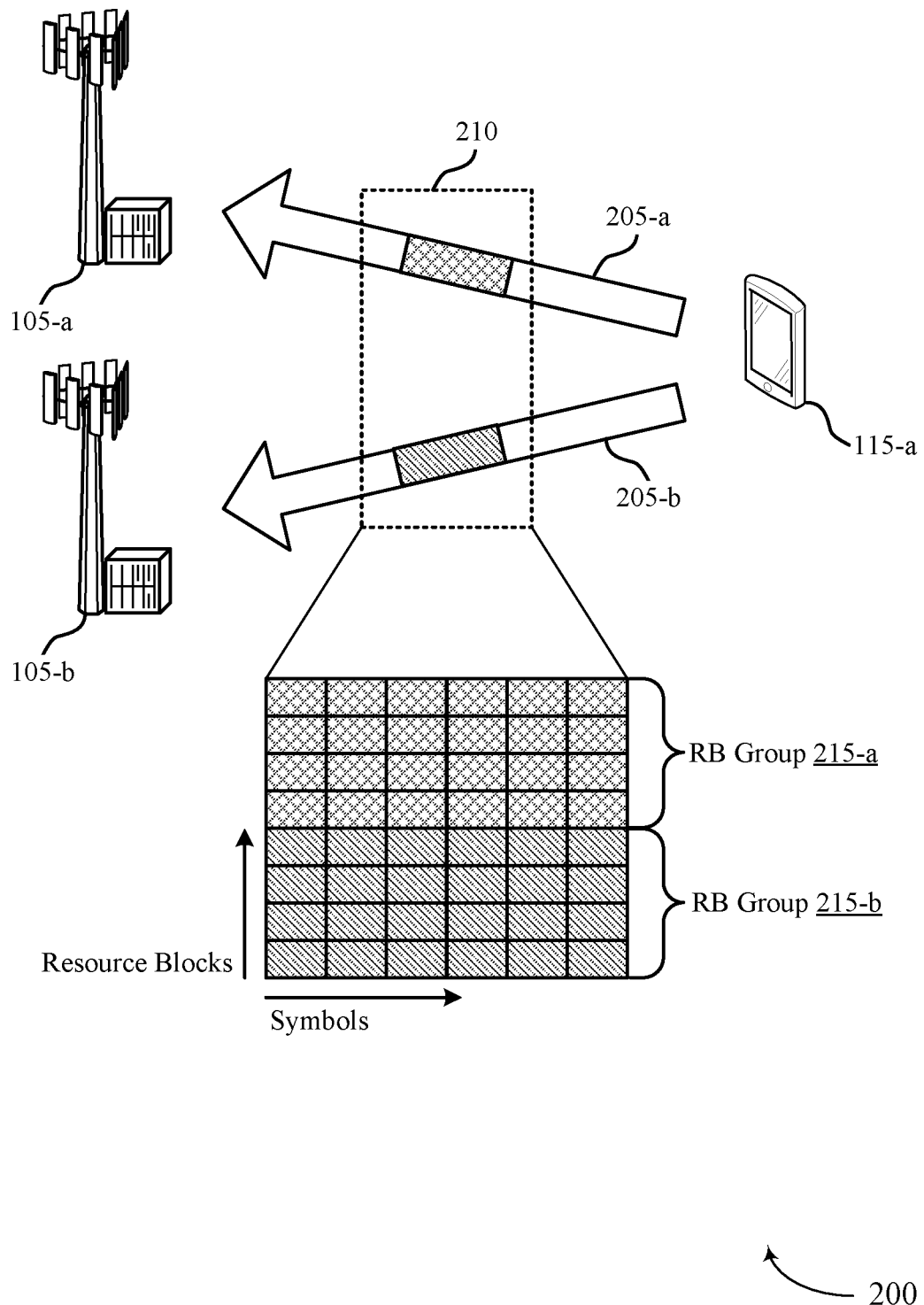
FIG. 2 illustrates an example of a wireless communications system that supports FDM for uplink shared channel transmissions with interlaced RB allocation in accordance with one or more aspects of the present disclosure.

FIG. 2 illustrates an example of a wireless communications system 200 that supports frequency division multiplexing for uplink shared channel transmissions with interlaced resource block allocation in accordance with one or more aspects of the present disclosure. The wireless communications system 200 may implement or be implemented by aspects of the wireless communications system 100. For example, the wireless communications system 200 may include a UE 115-a, a network entity 105-a, and a network entity 105-b, which may be examples of the corresponding wireless devices described with reference to FIG. 1. Additionally, the network entity 105-a and the network entity 105-b may include or be examples of one or more TRPs.

The network entity 105-a and the network entity 105-b may communicate with the UE 115-a via one or more communication links or channels. A channel may have a channel bandwidth, which may include one or more bandwidth parts (BWPs). As illustrated, the UE 115-a may transmit uplink messages to the network entity 105-a via an uplink channel 205-a, and may transmit uplink messages to the network entity 105-b via an uplink channel 205-b. The uplink channels 205 may include or be examples of uplink shared channels, such as PUSCH, and may each include one or more BWPs (e.g., dedicated uplink BWPs).

In some cases, the UE 115-a may use multiple TCI states to communicate with the network entities 105. A TCI state may be referred to as a beam configuration, which may indicate an antenna configuration or other parameters for generating a particular beam. Thus, each TCI state may identify a beam with a respective communication direction and resources. For example, the UE 115-a may operate in an FDM mode and may perform multiple transmissions concurrently using different beams and frequency resources. In some examples, the UE 115-a may support communications with multiple TRPs simultaneously. In the example of FIG. 2, the UE 115-a may transmit the multiple transmissions to the network entity 105-a, the network entity 105-b, or both, e.g., based on the communication direction of each beam.

In some cases, the UE 115-a may perform simultaneous multi-panel uplink transmissions to increase uplink throughput and reliability of the signaling. For example, the UE 115-a may communicate using one or more antenna panels. Each antenna panel may include one or more antenna elements. The UE 115-a may generate one or more beams (e.g., using the different antenna elements, the different antenna panels, etc.) for the multiple transmissions, such as a first beam for communicating with the network entity 105-a (e.g., via the uplink channel 205-a) and a second beam for communicating with the network entity 105-b (e.g., via the uplink channel 205-b). Additionally, in some examples, each beam generated by the UE 115-a (e.g., each TCJ state used by the UE 115-a) may be associated with a set of transmission parameters, such as power control parameters, TPMIs, or the like, among other examples.

For example, the UE 115-*a* may transmit an uplink message 210 to the network entities 105 in accordance with the FDM mode, such that the UE 115-*a* transmits a first portion of the uplink message 210 to the network entity 105-*a* using a first beam and transmits a second portion of the uplink message 210 to the network entity 105-*b* using a second beam. The uplink message 210 may be an example of an uplink shared channel message, such as a PUSCH message.

The network entity 105-*a* or the network entity 105-*b* may transmit control signaling, such as a DCI message, radio resource control (RRC) signaling, a medium access control-control element (MAC-CE), or the like, that includes scheduling information (e.g., an uplink grant) for the uplink message 210 to be transmitted by the UE 115-*a*. The scheduling information may schedule the uplink message 210, including one or more portions of the uplink message 210. For example, the scheduling information may indicate one or more time-frequency resources (e.g., RBs, symbols, or the like, among other examples) allocated for the UE 115-*a* to use for the uplink message 210. For example, the scheduling information may include an FDRA that indicates a set of RBs (e.g., physical resource blocks (PRBs)) allocated for the uplink message 210. In some examples, and as described in more detail with reference to FIGS. 3A and 3B, the FDRA may further indicate an RB set assignment and an interlace assignment for the set of RBs. Additionally, the scheduling information may include one or more sets of transmission parameters for the UE 115-*a* to use for the uplink message 210. Transmission parameters may include, but are not limited to, a TCI state or beam, a TPMI, one or more power control parameters, and the like.

To transmit the uplink message 210 using FDM, the UE 115-*a* may split the allocated set of RBs into a first portion to be transmitted to the network entity 105-*a* and a second portion to be transmitted to the network entity 105-*b*. According to the techniques described herein, the UE 115-*a* may apply one or more rules (e.g., procedures) for allocating RBs of the set of RBs into a first RB group (e.g., RB group 215-*a*) corresponding to the first portion of the uplink message 210 and a second RB group (e.g., RB group 215-*b*) corresponding to the second portion of the uplink message 210. The rule(s) may define how the set of RBs is split or otherwise partitioned into the RB group 215-*a* and the RB group 215-*b*, and may be based on the interlace assignment and the RB set assignment.

For example, the UE 115-*a* may apply a first rule based on a quantity of interlaces N indicated in the interlace assignment. Here, the UE 115-*a* may partition the set of RBs into the RB groups 215 by allocating a first subset of interlaces of the N assigned interlaces to the RB group 215-*a* and a second subset of interlaces of the N assigned interlaces to the RB group 215-*b*. To obtain the subsets of interlaces, the UE 115-*a* may apply a ceiling, ceil(N/2), to determine the interlaces for the RB group 215-*a*. Similarly, the UE 115-*a* may apply a remaining floor, floor(N/2), to determine the interlaces for the RB group 215-*b*. The RB group 215-*a* may thus include the first ceil(N/2) assigned interlaces, while the RB group 215-*b* may include the remaining floor(N/2) assigned interlaces. In this example, although each RB group 215 includes a subset of interlaces, both RB groups 215 may span all assigned RB sets.

Alternatively, the UE 115-*a* may apply a second rule based on a quantity of RB sets M indicated in the RB set assignment. The UE 115-*a* may allocate a first subset of RB sets of the M assigned RB sets to the RB group 215-*a* and a second subset of RB sets of the M assigned RB sets to the RB group 215-*b*. Here, the UE 115-*a* may apply a ceiling, ceil(M/2), to obtain the RB sets for the RB group 215-*a*, and may apply a remaining floor, floor(M/2), to obtain the RB sets for the RB group 215-*b*. The RB group 215-*a* may include the first ceil(M/2) assigned RB sets and the RB group 215-*b* may include the remaining floor(M/2) assigned RB sets. Each RB group 215 may include all of the assigned interlaces.

In some examples, the UE 115-*a* may be configured (e.g., preconfigured) to apply either the first rule or the second rule when preparing the set of RBs for the uplink message 210. Additionally, or alternatively, the UE 115-*a* may receive control signaling (e.g., DCI, RRC signaling, MAC-CE) indicating a rule for the UE 115-*a* to use, for example, per BWP, per component carrier (CC), per serving cell, or the like. In other examples, the UE 115-*a* may determine or otherwise select a rule to apply for the uplink message 210. For example, the UE 115-*a* may select a rule that provides a relatively even (e.g., equal) distribution of RBs across the RB groups 215. Accordingly, if the RB group 215-*a* or the RB group 215-*b* fails to be received by the network entity 105-*a* or the network entity 105-*b*, respectively, then approximately half of the information included in the uplink message 210 may still be received by the network.

As an example, the UE 115-*a* may select either the first rule or the second rule based on the quantity of assigned interlaces N and the quantity of assigned RB sets M, e.g., as indicated by the FDRA of the DCI. If N is an even number, the first rule may achieve an equal split of the set of RBs between the RB group 215-*a* and the RB group 215-*b* (e.g., the RB group 215-*a* and the RB group 215-*b* each include N/2 interlaces). If M is an even number, the second rule may provide an equal split between the RB group 215-*a* and the RB group 215-*b* (e.g., the RB group 215-*a* and the RB group 215-*b* each include M/2 RB sets). Thus, the UE 115-*a* may select the first rule when N is even, and may select the second rule when M is even.

In another example, to achieve a relatively equal distribution across the RB groups 215, the UE 115-*a* may select the first rule or the second rule based on which rule achieves a smaller difference between a quantity of RBs in the RB group 215-*a* and a quantity of RBs in the RB group 215-*b*. Put another way, the UE 115-*a* may select the rule that provides a greater value for a ratio $RB_1/RB_2$, where $RB_1$ represents the quantity of RBs in the RB group 215-*a* and $RB_2$ represents the quantity of RBs in the RB group 215-*b*. If, for example, N>M, the first rule may correspond to a greater value of $RB_1/RB_2$. Alternatively, if M>N, the second rule may correspond to a greater value of $RB_1/RB_2$. Accordingly, the UE 115-*a* may compare the values of M and N to determine the ratio $RB_1/RB_2$ and select the appropriate rule.

In some cases, the UE 115-*a* may select the first rule or the second rule based on a combination of approaches. For example, the UE 115-*a* may first determine or otherwise identify whether one or both of M and N are even; if so, the UE 115-*a* may select the rule corresponding to the even quantity (e.g., the first rule if N is even, the second rule if M is even). If both M and N are odd, the UE 115-*a* may select the first rule or the second rule based on the greatest value for the ratio $RB_1/RB_2$. If, however, both M and N are odd and M=N, the UE 115-*a* may be configured to select a default rule, e.g., may default to the first rule or the second rule.

Based on the selected or configured rule, the UE 115-*a* may allocate the set of RBs into the RB group 215-*a* and the RB group 215-*b*. The UE 115-*a* may transmit the uplink message 210 by transmitting the RB group 215-*a* to the network entity 105-*a* and transmitting the RB group 215-*b* to the network entity 105-*b*. The UE 115-*a* may use a first set of transmission parameters for transmitting the RB group 215-*a* and a second set of transmission parameters for transmitting the RB group 215-*b*. The first and second sets of transmission parameters may be indicated by the scheduling information for the uplink message 210 (e.g., the control signaling scheduling the uplink message 210). For example, the scheduling information may include an SRS resource set indicator that indicates two SRS resource sets corresponding to the two RB groups 215, and an SRI for each RB group 215, where the SRI indicates one or more SRS resources from the corresponding SRS resource set that is associated with a set of transmission parameters. Thus, the UE 115-*a* may determine the set of transmission parameters to use for an RB group 215 based on the corresponding indicated SRI. For example, the scheduling information may include a first SRS resource set indicator indicating a first SRS resource set corresponding to the RB group 215-*a* and a first SRI indicating one or more SRS resources from the first SRS resource set. The scheduling information may further include a second SRS resource set indicator indicating a second SRS resource set corresponding to the RB group 215-*b* and a second SRI indicating one or more SRS resources from the second SRS resource set. The UE 115-*a* may transmit the RB group 215-*a* using the first set of transmission parameters associated with the first SRI/first SRS resource set and may transmit the RB group 215-*b* using the second set of transmission parameters associated with the second SRI/second SRS resource set.

In some cases, the UE 115-*a* may be configured to transmit the uplink message 210 according to a first FDM scheme (e.g., FDM scheme A). Here, the UE 115-*a* may apply a joint rate matching scheme to the RB groups 215, such that both the RB group 215-*a* and the RB group 215-*b* are associated with a same redundancy version. In this example, the uplink message 210 may be transmitted without repetition. Alternatively, the UE 115-*a* may transmit the uplink message 210 with repetition, e.g., according to a second FDM scheme (e.g., FDM scheme B). The UE 115-*a* may apply different rate matching schemes to each RB group 215. That is, the RB group 215-*a* may be an example of a first repetition of the uplink message 210 (e.g., a first repetition of a transport block of the uplink message 210) that is associated with a first redundancy version, while the RB group 215-*b* may be an example of a second repetition of the uplink message 210 (e.g., a second repetition of the transport block of the uplink message 210) that is associated with a second redundancy version.

Figure 3A:
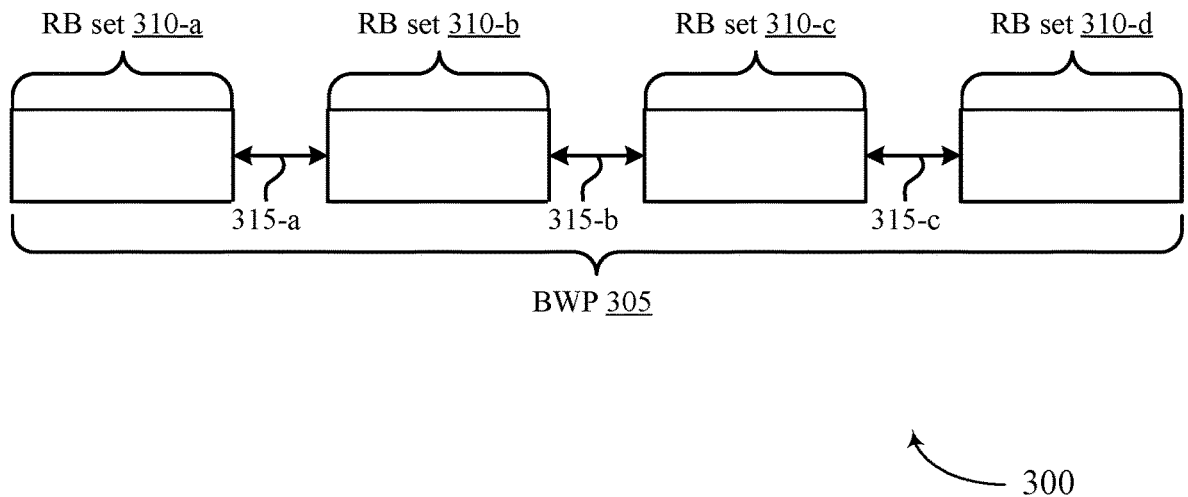
FIGS. 3A and 3B illustrate examples of RB allocation schemes that supports FDM for uplink shared channel transmissions with interlaced RB allocation in accordance with one or more aspects of the present disclosure.
Figure 3B:
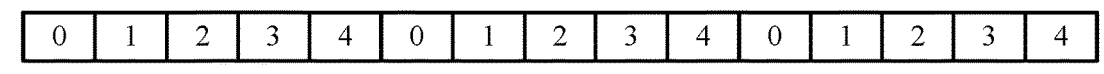

FIGS. 3A and 3B illustrate examples of resource block allocation schemes 300 and 301 that support FDM for uplink shared channel transmissions with interlaced RB allocation in accordance with one or more aspects of the present disclosure. The RB allocation schemes 300 and 301 may be implemented by or may implement aspects of a wireless communications system as described with reference to FIG. 1 or 2. For example, aspects of the RB allocation schemes 300 and 301 may be implemented at a UE performing FDM uplink shared channel transmissions.

For example, the RB allocation scheme 300 may be an example of an RB set allocation and the RB allocation scheme 301 may be an example of an interlaced RB allocation. A UE may receive DCI (e.g., DCI format 0_1) scheduling an uplink (e.g., PUSCH) message. The DCI may indicate an FDRA for a set of RBs allocated for the uplink message. The FDRA may indicate an RB set assignment (e.g., illustrated by the RB allocation scheme 300) and an interlace assignment (e.g., illustrated by the RB allocations scheme 301). That is, the FDRA may allocate one or more RB sets and one or more interlaces for the set of RBs.

Uplink resource allocation in this manner may be referred to as resource allocation type 2. Resource allocation type 2 may be configured for a dedicated uplink BWP. More specifically, resource allocation type 2 may be used to schedule uplink (e.g., PUSCH) messages within an active uplink BWP when a higher layer parameter useInterlacePUCCH-PUSCH-r16 is configured for the active uplink BWP (e.g., when the useInterlacePUCCH-PUSCH-r16 field is configured within BWP-UplinkDedicated). In some cases, resource allocation type 2 may be used by devices (e.g., UEs, network entities) operating in a shared or unlicensed RF spectrum, such as New Radio Unlicensed (NR-U).

For example, as illustrated in FIG. 3A, the resource allocation scheme 300 may support shared RF spectrum communications in an uplink BWP 305 via the use of RB sets 310 and guard bands 315. The BWP 305 may be part of a shared RF spectrum band (e.g., a 5 gigahertz (GHz) band, a 6 GHz band) that is shared by multiple technologies, such as Wi-Fi and NR-U. To prevent collisions and interference between devices of different technologies, available resources (e.g., RBs) in the BWP 305 may be constrained to RB sets 310 (e.g., RB set 310-*a*, RB set 310-*b*, RB set 310-*c*, RB set 310-*d*) separated by guard bands 315 (e.g., guard band 315-*a*, guard band 315-*b*, guard band 315-*c*). A device, such as a UE, may perform a listen-before-talk (LBT) type channel access procedure to sense whether the channel is free (e.g., not used by other devices) to obtain the channel medium and communicate. Thus, the BWP 305 may be split into the RB sets 310, where each RB set 310 corresponds to a channel (e.g., an LBT bandwidth) for the channel access procedure. In some examples, each LBT bandwidth (e.g., each RB set 310) may span 20 Megahertz (MHz).

An FDRA including an RB set assignment may indicate a starting (e.g., initial) RB set 310 and a quantity of contiguous RB sets 310, which may be represented by a resource indication value (RIV). The RB set assignment may include a quantity of bits Y given by Equation 1 below, where $N_{RB-set,UL}^{BWP}$ is the quantity of RB sets 310 included in the active uplink BWP (e.g., the BWP 305).

$$\left\lceil \log_2\left(\frac{N_{RB-set,UL}^{BWP}\left(N_{RB-set,UL}^{BWP}+1\right)}{2}\right)\right\rceil \quad (1)$$

The guard bands 315 may provide separation between the RB sets 310. For example, when the FDRA indicates adjacent RB sets 310, such as RB set 310-*a* and RB set 310-*b*, the guard band 315-*a* between the adjacent RB sets 310 may also be assigned. The guard bands 315 may be configured by an intra-cell guard band parameter (e.g., intraCellGuardBandUL-r16). Each guard band 315 may be configured with a size, which may be given by a quantity of RBs. In some examples, a guard band 315 may have a zero size, such that adjacent RB sets 310 are not separated in the frequency domain.

Figure 15:
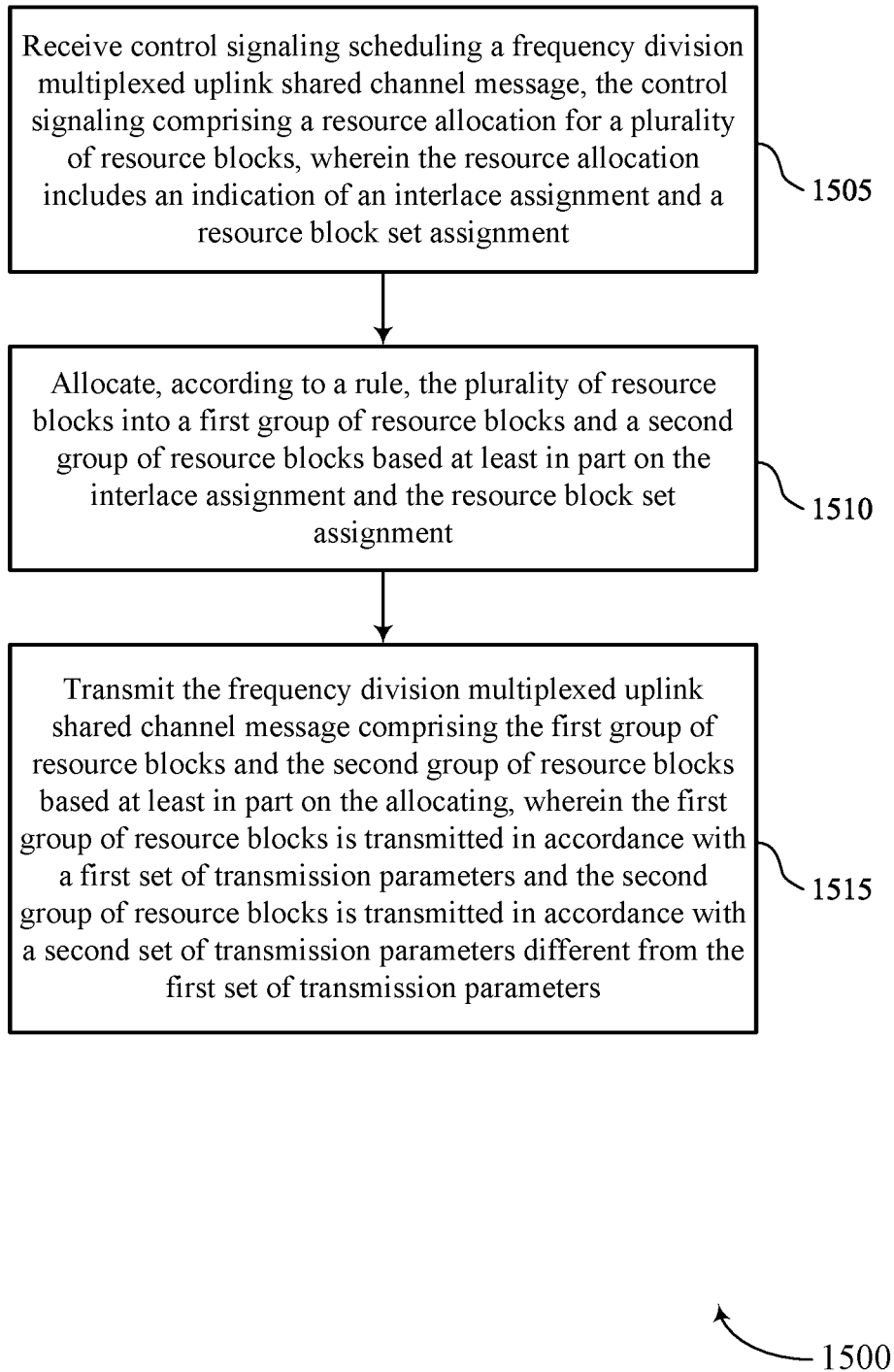
FIGS. 15 through 18 show flowcharts illustrating methods that support FDM for uplink shared channel transmissions with interlaced RB allocation in accordance with one or more aspects of the present disclosure.

The RB allocation scheme 301 illustrated in FIG. 3B may be an example of an interlaced resource allocation. An interlace may refer to a set of equally-spaced, non-contiguous RBs within a configured BWP, and may be understood as a basic unit for resource allocation in some scenarios. In some cases, the structure of an interlaced resource allocation may depend on a subcarrier spacing (SCS) of an associated active BWP. For example, for an active uplink BWP with 15 kilohertz (kHz) SCS, there may be a total of ten interlaces available for allocation, while for 30 kHz SCS, there may be a total of five interlaces available for allocation. FIG. 3B illustrates these five interlaces, e.g., interlace 320-*a*, interlace 320-*b*, interlace 320-*c*, interlace 320-*d*, and interlace 320-*e*. Each interlace 320 may include a quantity of RBs, such that a set of RBs may be allocated across multiple interlaces 320. In the example of FIG. 3B, 15 total RBs may be allocated via five interlaces 320, where each interlace 320 includes three RBs.

An FDRA may include a quantity of bits X to indicate the interlace assignment for the UE. In some examples, each interlace 320 may be associated with an interlace index (e.g., the interlace 320-*a* may be represented by an index of 0, the interlace 320-*b* may be represented by an index of 1, the interlace 320-*c* may be represented by an index of 2, the interlace 320-*d* may be represented by an index of 3, and the interlace 320-*e* may be represented by an index of 4), and the interlace assignment may indicate allocated interlaces by indicating the corresponding interlace index. Additionally, the quantity of bits X may depend on the SCS of the active uplink BWP. For 30 kHz SCS, X may be equal to 5, where the interlace assignment is indicated via a 5-bit bitmap (e.g., 5 bits may indicate the allocated interlaces). The bitmap may indicate any combination of the interlaces 320 allocated for the uplink message. For example, bits of the bitmap may be ordered such that the interlace associated with an index of 0 (e.g., interlace 320-*a*) to the interlace associated with an index of 4 (e.g., interlace 320-*e*) are mapped from the most significant bit (MSB) to the least significant bit (LSB) of the bitmap. A bit value of 1 may indicate that the interlace 320 corresponding to the bit location is allocated to the UE; otherwise, the interlace 320 may not be assigned.

For 15 kHz SCS, X may be equal to 6. Here, the 6 bits may include an indication of an initial interlace index and a quantity of contiguous interlace indices, which may be represented by an RIV. The remaining bits of the 6 bits may be used to indicate predefined interlace combinations (e.g., RIVs).

When an FDRA for an uplink message includes both an interlace assignment and an RB set assignment, the FDRA field may include a total of X+Y bits, where X includes the bits indicating the interlace assignment and Y includes the bits indicating the RB set assignment. For example, the XMSBs (e.g., the first 5 or 6 bits of the FDRA field, depending on whether the SCS is 30 kHz or 15 kHz, respectively) may indicate the interlace assignment, and the YLSBs (e.g., the remaining Y bits of the FDRA field) may indicate the RB set assignment. In such examples, the uplink message may be transmitted on a set of RBs that are allocated in an interlaced configuration (e.g., based on the interlace assignment) and are located within the assigned RB sets 310.

The UE may allocate the set of RBs for the uplink message into a first RB group and a second RB according to a rule and based on the interlace assignment and the RB set assignment. For example, as described in greater detail with reference to FIG. 4, the UE may allocate the set of RBs according to the rule such that the first RB group includes a first subset of the assigned (i.e., allocated) interlaces 320 and the second RB group includes a second subset of the assigned (i.e., allocated) interlaces 320. Alternatively, and as described in greater detail with reference to FIG. 5, the UE may allocate the set of RBs according to the rule such that the first RB group includes a first subset of the assigned RB sets 310 and the second RB group includes a second subset of the assigned (e.g., allocated) RB sets 310. Additionally, in some examples, the UE may allocate a guard band 315 between assigned RB sets 310 to either the first RB group or the second group. In other examples, the UE may split RBs of a guard band 315 between the first RB group and the second RB group, or may drop RBs of the guard band from the set of RBs used for the uplink message.

Figure 4:
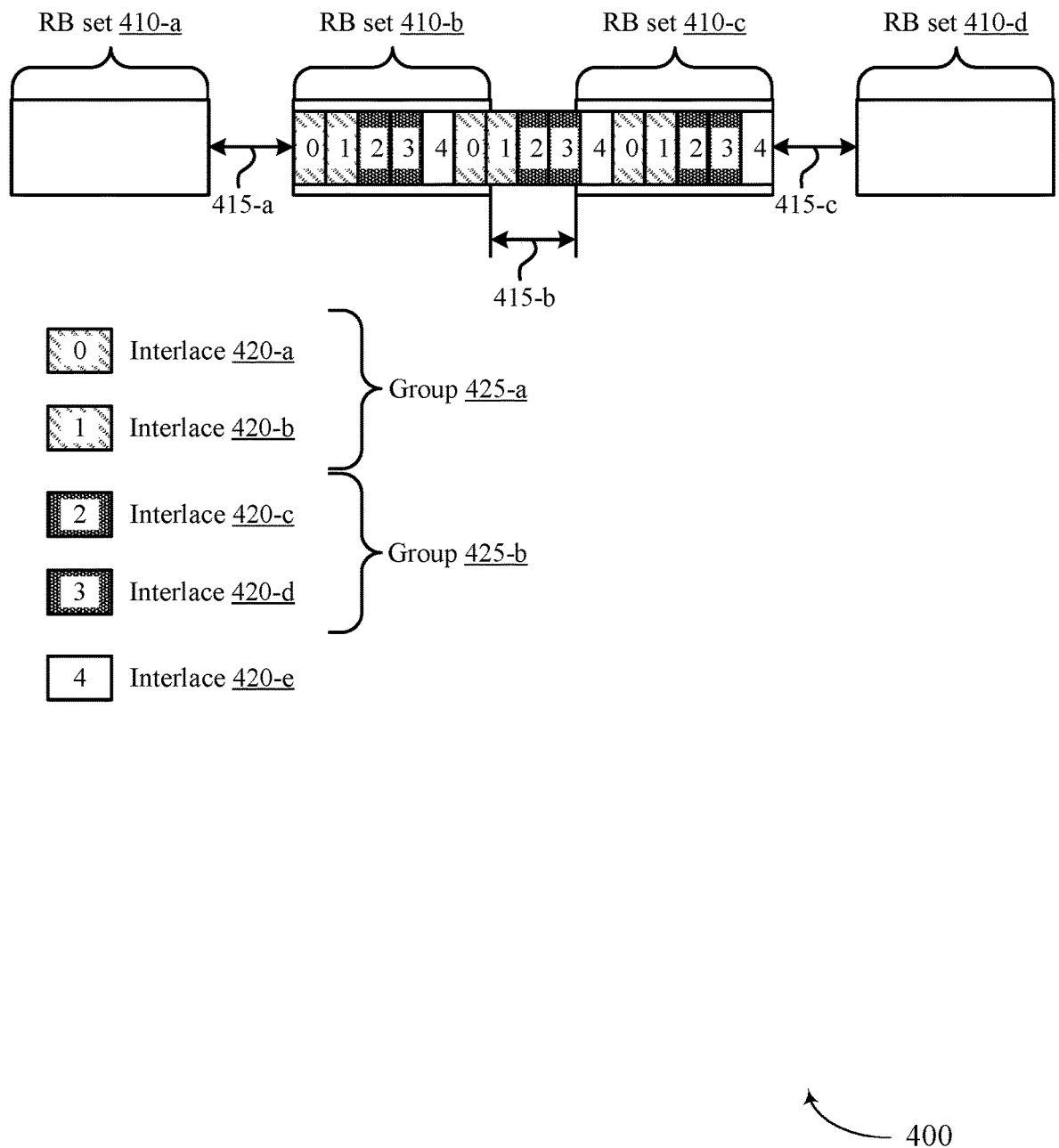
FIG. 4 illustrates an example of an RB allocation scheme that supports FDM for uplink shared channel transmissions with interlaced RB allocation in accordance with one or more aspects of the present disclosure.

FIG. 4 illustrates an example of an RB allocation scheme 400 that supports FDM for uplink shared channel transmissions with interlaced RB allocation in accordance with one or more aspects of the present disclosure. The RB allocation scheme 400 may be implemented by or may implement aspects of a wireless communications system as described with reference to FIG. 1 or 2. For example, aspects of the RB allocation scheme 400 may be implemented at a UE performing FDM uplink shared channel transmissions. More specifically, the RB allocation scheme 400 may be an example of an RB allocation performed according to a rule based on an interlace assignment in accordance with the techniques described herein.

A UE may receive control signaling scheduling an FDM uplink shared channel message, such as a PUSCH message, over an uplink channel (e.g., PUSCH) associated with an active uplink BWP. In some cases, the active uplink BWP may be configured with multiple available RB sets 410 (e.g., RB set 410-*a*, RB set 410-*b*, RB set 410-*c*, RB set 410-*d*) to be used for LBT or other channel access procedures and uplink transmissions. The active uplink BWP may further be configured with a guard band 415 between adjacent (e.g., in a frequency domain) RB sets 410, where each guard band 415 may include a quantity of RBs. For example, a guard band 415-*a* may separate the RB set 410-*a* and the RB set 410-*b*, a guard band 415-*b* may separate the RB set 410-*b* and the RB set 410-*c*, and a guard band 415-*c* may separate the RB set 410-*c* and the RB set 410-*d*.

The control signaling may indicate a resource allocation (e.g., FDRA) for a set of RBs to be used for transmission of the PUSCH message. As described with reference to FIGS. 3A and 3B, the resource allocation may include an interlace assignment and an RB set assignment. In the example of FIG. 4, the interlace assignment may indicate four interlaces 420 (e.g., N=4): an interlace 420-*a*, an interlace 420-*b*, an interlace 420-*c*, and an interlace 420-*d*. The RB set assignment may indicate two RB sets 410 (e.g., M=2), such as the RB set 410-*b* and the RB set 410-*c*, from the available RB sets 410 (e.g., associated with the active uplink BWP). While an interlace 420-*e* may be available, the interlace 420-*e* may not be assigned, e.g., RBs associated with the interlace 420-*e* may not be utilized for the PUSCH message. Likewise, RB sets 410-*a* and 410-*d* may be available for use in the active uplink BWP, but may not be assigned by the FDRA.

To transmit the PUSCH message using FDM, the UE may split the allocated set of RBs into a first group of RBs (e.g., group 425-*a*) and a second group of RBs (e.g., group 425-*b*) by applying a rule (e.g., procedure). The rule may define how the set of RBs is split or otherwise partitioned into the group 425-*a* and the group 425-*b*, and may be based on the interlace assignment and the RB set assignment. In the example of FIG. 4, the UE may allocate the set of RBs according to a rule and based on a quantity of interlaces N indicated in the interlace assignment.

For example, the rule may define that the set of RBs is partitioned by interlaces 420, such that the group 425-*a* includes a first subset of interlaces of the N assigned interlaces 420 and the group 425-*b* includes a second subset of interlaces of the N assigned interlaces 420. The first subset of interlaces (e.g., the group 425-a) may include the interlace 420-a and the interlace 420-b, while the second subset of interlaces (e.g., the group 425-b) may include the interlace 420-c and the interlace 420-d. In accordance with the rule, the UE may apply a ceiling, ceil(N/2), using the quantity of interlaces N to determine the first subset of interlaces included in the group 425-a. The second subset of interlaces included in the group 425-b may include the remaining interlaces 420 of the N assigned interlaces 420. That is, the UE may apply a remaining floor, floor(N/2), to determine the second subset of interlaces included in the group 425-b. The group 425-a may thus include the first ceil(N/2) assigned interlaces indicated in the interlace assignment (e.g., in the FDRA), while the group 425-b may include the remaining floor(N/2) assigned interlaces indicated in the interlace assignment.

As illustrated, the groups 425 may be split by interlaces 420, but may span all assigned RB sets 410. That is, both the group 425-a and the group 425-b may be associated with the RB sets 410-b and 410-c indicated in the RB set assignment.

In some examples, the UE may select the rule illustrated by the RB allocation scheme 400 based on the interlace assignment, the RB set assignment, or both. For instance, the UE may select the rule based on the value of N being an even number. That is, in the example of FIG. 4, because N is an even number, allocating according to the rule based on N provides an equal distribution of RBs between the group 425-a and the group 425-b. In some examples, the UE may select the rule based on the value of N being greater than the value of M.

Figure 5:
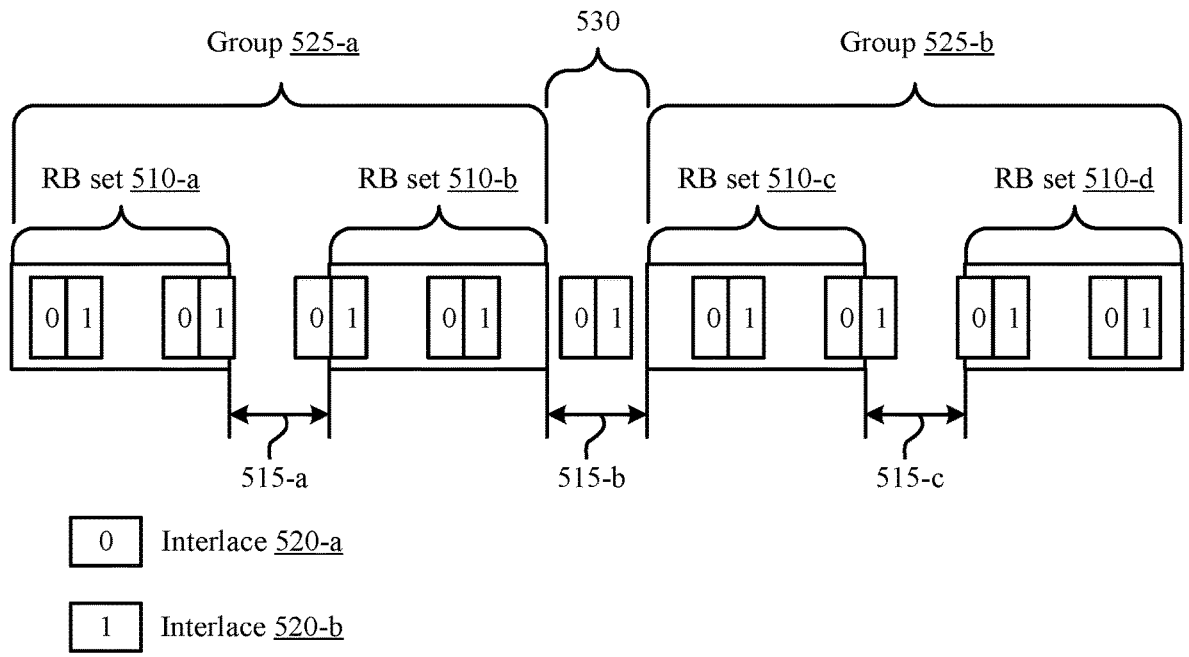
FIG. 5 illustrates an example of an RB allocation scheme that supports FDM for uplink shared channel transmissions with interlaced RB allocation in accordance with one or more aspects of the present disclosure.

FIG. 5 illustrates an example of an RB allocation scheme 500 that supports FDM for uplink shared channel transmissions with interlaced RB allocation in accordance with one or more aspects of the present disclosure. The RB allocation scheme 500 may be implemented by or may implement aspects of a wireless communications system as described with reference to FIG. 1 or 2. For example, aspects of the RB allocation scheme 500 may be implemented at a UE performing FDM uplink shared channel transmissions. More specifically, the RB allocation scheme 500 may be an example of an RB allocation performed according to a rule based on an RB set assignment in accordance with the techniques described herein.

A UE may receive control signaling scheduling an FDM uplink shared channel message, such as a PUSCH message, over an uplink channel (e.g., PUSCH) associated with an active uplink BWP. In some cases, the active uplink BWP may be configured with multiple available RB sets 510 to be used for LBT or other channel access procedures and uplink transmissions. The active uplink BWP may further be configured with a guard band 515 between adjacent (e.g., in a frequency domain) RB sets 510, where each guard band 515 may include a quantity of RBs.

The control signaling may indicate a resource allocation (e.g., FDRA) for a set of RBs to be used for transmission of the PUSCH message. As described with reference to FIGS. 3A and 3B, the resource allocation may include an interlace assignment and an RB set assignment. In the example of FIG. 5, the interlace assignment may indicate two interlaces 520 (e.g., N=2), including an interlace 520-a and an interlace 520-b. The RB set assignment may indicate four RB sets 510 (e.g., M=4), such as an RB set 510-a, an RB set 510-b, an RB set 510-c, and an RB set 510-d.

To transmit the PUSCH message using FDM, the UE may split the allocated set of RBs into a first group of RBs (e.g., group 525-a) and a second group of RBs (e.g., group 525-b) by applying a rule (e.g., procedure). The rule may define how the set of RBs is split or otherwise partitioned into the group 525-a and the group 525-b, and may be based on the interlace assignment and the RB set assignment. In the example of FIG. 5, the UE may allocate the set of RBs according to the rule and based on a quantity of RB sets M indicated in the RB set assignment.

For example, the rule may define that the set of RBs is partitioned by RB sets 510, such that the group 525-a includes a first subset of RB sets of the M assigned RB sets 510 and the group 525-b includes a second subset of interlaces of the M assigned RB sets 510. The first subset of RB sets (e.g., the group 525-a) may include the RB set 510-a and the RB set 510-b, while the second subset of RB sets (e.g., the group 525-b) may include the RB set 510-c and the RB set 510-d. In accordance with the rule, the UE may apply a ceiling, ceil(M/2), using the quantity of RB sets M to determine the first subset of RB sets included in the group 525-a. The second subset of RB sets included in the group 525-b may include the remaining RB sets 510 of the M assigned RB sets 510. That is, the UE may apply a remaining floor, floor(M/2), to determine the second subset of RB sets included in the group 525-b. The group 525-a may thus include the first ceil(M/2) assigned RB sets 510 indicated in the RB set assignment (e.g., in the FDRA), while the group 525-b may include the remaining floor(M/2) assigned RB sets 510 indicated in the RB set assignment. As illustrated, the groups 525 may be split by RB sets 510, but may include all assigned interlaces 520. That is, both the group 525-a and the group 525-b may be associated with the interlaces 520-a and 520-b indicated in the interlace assignment.

The RB set assignment may further indicate one or more RBs associated with each guard band 515 between adjacent RB sets 510. For example, the RB set assignment may indicate a guard band 515-a between the RB set 510-a and the RB set 510-b, a guard band 515-b between the RB set 510-b and the RB set 510-c, and a guard band 515-c between the RB set 510-c and the RB set 510-d. When allocating the set of RBs, the UE may determine whether to allocate each guard band 515 to the group 525-a, the group 525-b, or both, or may determine to refrain from transmitting on a guard band 515. For example, when a guard band 515 is located (e.g., in the frequency domain) between adjacent RB sets 510 that belong to a same group 525, the UE may allocate the guard band 515 to the same group 525. As illustrated, the one or more RBs associated with the guard band 515-a may belong to the group 525-a based on the group 525-a including both the RB set 510-a and the RB set 510-b. Likewise, the group 525-b includes both the RB set 510-c and the RB set 510-d, and thus the UE may allocate the one or more RBs associated with the guard band 515-c to the group 525-b.

The guard band 515-b, in contrast, may be between the RB set 510-b belonging to the group 525-a and the RB set 510-c belonging to the group 525-b. That is, although the RB set 510-b and the RB set 510-c are adjacent in the frequency domain, they are associated with different groups 525. Accordingly, the UE may allocate one or more RBs 530 associated with the guard band 515-b to the group 525-a, the group 525-b, or a combination thereof. In a first example, the UE may allocate the one or more RBs 530 to a group 525 based on a total quantity of RBs in the group 525-a and a total quantity of RBs in the group 525-b. Here, the UE may compare the total quantities of RBs in each respective group 525 and may assign the one or more RBs 530 to the group 525 having the smallest total quantity of RBs. For instance, if the group 525-*a* included fewer total RBs than the group 525-*b*, the UE may assign the one or more RBs 530 to the group 525-*a*.

In a second example, the UE may allocate the one or more RBs 530 to a default (e.g., fixed) group 525. That is, the UE may be configured to assign the one or more RBs 530 to either the group 525-*a* or the group 525-*b*, e.g., regardless of a total quantity of RBs in each group 525.

In a third example, the UE may split (e.g., distribute) the one or more RBs 530 between the group 525-*a* and the group 525-*b*. The UE may, for example, allocate a first portion of the one or more RBs 530 to the group 525-*a* and a second portion of the one or more RBs 530 to the group 525-*b*. In a fourth example, the UE may remove (e.g., drop) the one or more RBs 530 from the set of RBs allocated for the PUSCH message. That is, the UE may not assign the one or more RBs 530 to any group 525 and may refrain from transmitting the PUSCH message on any of the one or more RBs 530.

In some examples, the UE may select the rule illustrated by the RB allocation scheme 500 based on the interlace assignment, the RB set assignment, or both. For instance, the UE may select the rule based on the value of M being an even number. That is, in the example of FIG. 5, because M is an even number, allocating according to the rule based on M provides an equal distribution of RBs between the group 525-*a* and the group 525-*b*. In some examples, the UE may select the rule based on the value of M being greater than the value of N.

Figure 6:
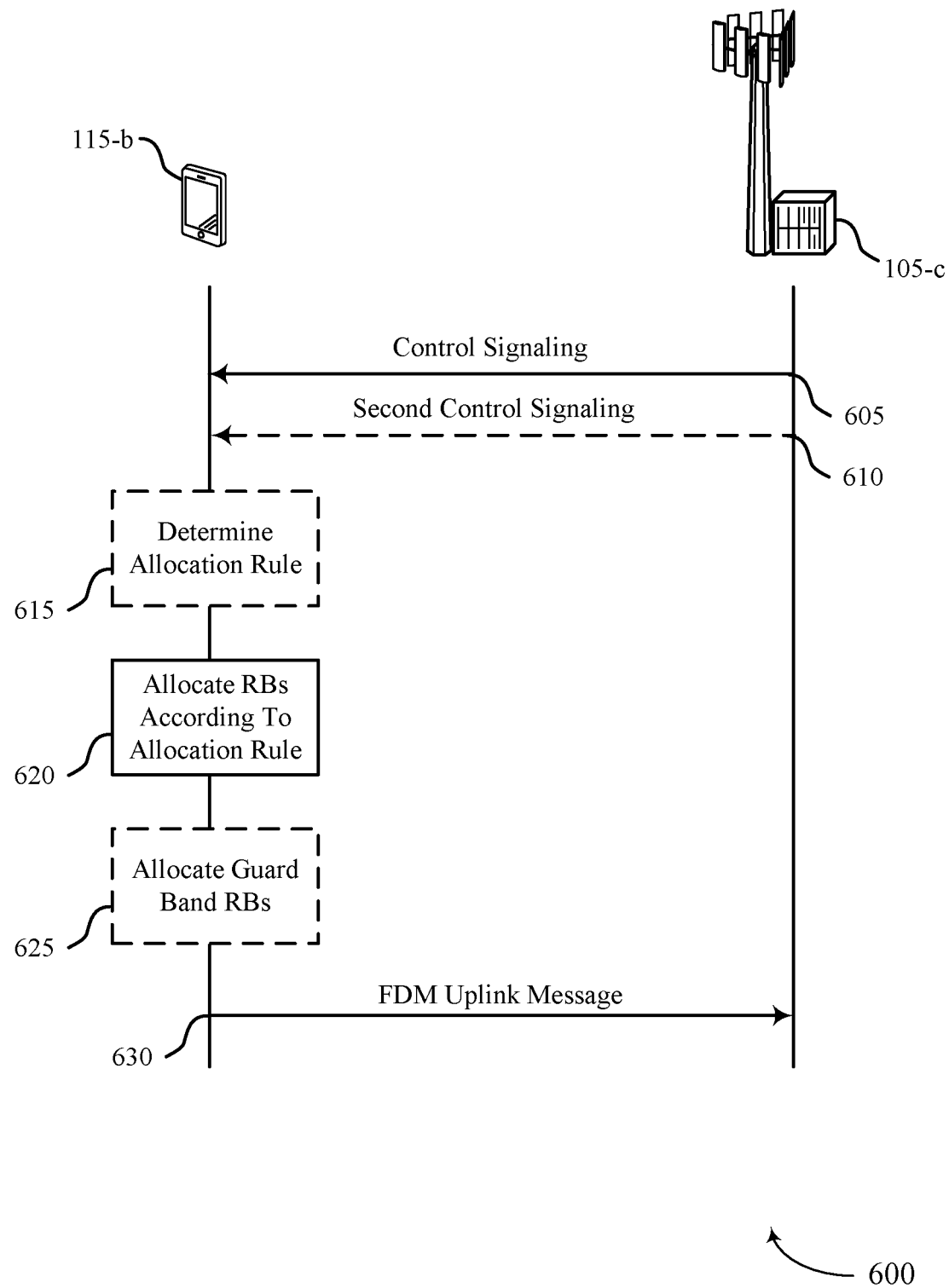
FIG. 6 illustrates an example of a process flow that supports FDM for uplink shared channel transmissions with interlaced RB allocation in accordance with one or more aspects of the present disclosure.

FIG. 6 illustrates an example of a process flow 600 that supports FDM for uplink shared channel transmissions with interlaced RB allocation in accordance with one or more aspects of the present disclosure. The process flow 600 may implement aspects of wireless communications systems 100 and 200, or may be implemented by aspects of the wireless communications system 100 and 200. The network entity 105-*c* and the UE 115-*b* may be examples of a network entity 105 and a UE 115, as described with reference to FIGS. 1 and 2. In the following description of the process flow 600, the operations between the network entity 105-*c* and the UE 115-*b* may be transmitted in a different order than the example order shown, or the operations performed by the network entity 105-*c* and the UE 115-*b* may be performed in different orders or at different times. Some operations may also be omitted from the process flow 600, and other operations may be added to the process flow 600.

At 605, the network entity 105-*c* may transmit, and the UE 115-*b* may receive, control signaling scheduling an FDM uplink shared channel message. The control signaling may include or may be an example of DCI, RRC signaling, a MAC-CE, or the like. The control signaling may include a resource allocation for a set of RBs. The resource allocation may include an indication of an interlace assignment and an RB set assignment. For example, the resource allocation may be an example of an FDRA that includes a first quantity of bits associated with the interlace assignment and a second quantity of bits associated with the RB set assignment. The first quantity of bits may indicate an interlace allocation (e.g., a starting interlace and a quantity of interlaces) and the second quantity of bits may indicate an RB set allocation (e.g., a starting RB set and a quantity of RB sets). As a non-limiting example, the FDRA may indicate four interlaces and two RB sets.

In some examples, the resource allocation (e.g., the RB set assignment) may indicate (e.g., configure) one or more RBs associated with one or more guard bands, each guard band located between a pair of assigned RB sets that are adjacent in a frequency domain. For example, the RB set assignment indicating the two RB sets may indicate a first RB set and a second RB set that are adjacent in the frequency domain. The RB set assignment may further indicate one or more RBs associated with a guard band between the first RB set and the second RB set.

In some examples, the control signaling may be an example of or may include an uplink grant. Additionally, or alternatively, the control signaling may indicate a first set of transmission parameters and a second set of transmission parameters to be used for the FDM uplink shared channel message. Transmission parameters may include, but are not limited to, one or more beams (e.g., TCI states or spatial relations), one or more power control parameters, one or more precoders, or the like. In some cases, the control signaling may indicate a first SRS resource set indicator associated with a first SRS resource set and a first SRI that indicates one or more SRS resources from the first SRS resource set, and may indicate a second SRS resource set indicator associated with a second SRS set and a second SRI that indicates one or more SRS resources from the second SRS resource set. In some examples, the control signaling may additionally indicate one or more TPMIs. For instance, the control signaling may indicate a first TPMI and a second TPMI.

At 610, the network entity 105-*c* may optionally transmit, and the UE 115-*b* may receive, second control signaling. The second control signaling may indicate a rule (e.g., an allocation rule) for the UE 115-*b* to use to allocate the set of RBs into a first group of RBs and a second group of RBs. The second control signaling may include or may be an example of DCI, RRC signaling, a MAC-CE, or the like.

At 615, the UE 115-*b* may determine (e.g., select) a rule (e.g., an allocation rule) for allocating RBs, e.g., for allocating the set of RBs into the first group of RBs and the second group of RBs. In some cases, the rule may be based on the interlace assignment and the RB set assignment. In some examples, the UE 115-*b* may be configured (e.g., via control signaling, such as the second control signaling, or be statically configured) with the rule. For example, the UE 115-*b* may determine the rule based on receiving the second control signaling.

In other examples, the UE 115-*b* may determine (e.g., select) the rule based on the resource allocation (e.g., based on the control signaling). For example, the UE 115-*b* may determine or otherwise identify a quantity of interlaces indicated in the interlace assignment, a quantity of RB sets indicated in the RB set assignment, or both.

For example, the UE 115-*b* may determine that the interlace assignment indicates an even quantity of interlaces, and may select a first rule based on the quantity of interlaces being even. Additionally, or alternatively, the UE 115-*b* may determine that the RB set assignment indicates an even quantity of RB sets, and may select a second rule based on the quantity of RB sets being even. In some cases, the UE 115-*b* may select the rule based on comparing the quantity of interlaces and the quantity of RB sets. For example, the UE 115-*b* may select the first rule based on the quantity of interlaces being greater than the quantity of RB sets, or may select the second rule based on the quantity of RB sets being greater than the quantity of interlaces. In some examples, the UE 115-*b* may determine or otherwise select a default rule, which may be the first rule or the second rule. For example, if both the quantity of RB sets and the quantity of interlaces are odd values and are equal to one another, the UE 115-*b* may select the default rule. The default rule may be configured (e.g., preconfigured) or may be signaled to the UE 115-*b* (e.g., via control signaling).

At 620, the UE 115-b may allocate, according to the rule (e.g., determined at 615), the set of RBs into the first group of RBs and the second group of RBs based on the interlace assignment and the RB set assignment. The first group of RBs may be associated with a first set of SRS resources and a first set of transmission parameters, which may be indicated by the control signaling at 605. For example, the first group of RBs may be associated with the first SRI and the first TPMI included in the control signaling. Similarly, the second group of RBs may be associated with a second set of SRS resources and a second set of transmission parameters, which may be indicated by the control signaling at 605. For instance, the second group of RBs may be associated with the second SRI and the second TPMI indicated in the control signaling.

For example, based on the rule, the UE 115-b may allocate the set of RBs into the first group of RBs and the second group of RBs based on the quantity of interlaces indicated in the interlace assignment (e.g., in the FDRA). Here, the UE 115-b may allocate the set of RBs such that the first group of RBs may include a first subset of interlaces of the quantity of interlaces and the second group of RBs may include a second subset of interlaces of the quantity of interlaces, and such that both the first group of RBs and the second group of RBs are associated with one or more (e.g., all) RB sets of the quantity of RB sets indicated in the RB set assignment.

Alternatively, according to the rule, the UE 115-b may allocate the set of RBs into the first group of RBs and the second group of RBs based on the quantity of RB sets indicated in the RB set assignment (e.g., in the FDRA). Here, the UE 115-b may allocate the set of RBs such that the first group of RBs may include a first subset of RB sets of the quantity of RB sets and the second group of RBs may include a second subset of RB sets of the quantity of RB sets, and such that both the first group of RBs and the second group of RBs are associated with one or more (e.g., all) interlaces of the quantity of interlaces indicated in the interlace assignment.

In some examples, the UE 115-b may allocate, according to the rule, the set of RBs into the first group of RBs and the second group of RBs based on both the quantity of interlaces indicated in the interlace assignment and the quantity of RB sets indicated in the RB set assignment. For example, the UE 115-b may allocate a first subset of interlaces of the quantity of interlaces to the first group of RBs and a second subset of interlaces of the quantity of interlaces to the second group of RBs based on the quantity of interlaces being an even value (e.g., and the quantity of RB sets being an odd value), based on the quantity of interlaces being greater than the quantity of RB sets, or a combination thereof. Alternatively, the UE 115-b may allocate a first subset of RB sets of the quantity of RB sets to the first group of RBs and a second subset of RB sets of the quantity of RB sets to the second group of RBs based on the quantity of RB sets being an even value (e.g., and the quantity of interlaces being an odd value), based on the quantity of RB sets being greater than the quantity of interlaces, or a combination thereof.

At 625, the UE 115-b may optionally allocate the one or more RBs associated with the guard band to the first group of RBs, the second group of RBs, or both. In some cases, the UE 115-b may allocate the one or more RBs associated with the guard band based on allocating the set of RBs into the first group of RBs and the second group of RBs. For example, the one or more RBs associated with the guard band may be located (e.g., in the frequency domain) between the first RB set and the second RB set. If, after the allocating at 620, the first RB set and the second RB set are both associated with (e.g., included in) the first group of RBs, the UE 115-b may allocate the one or more RBs associated with the guard band to the first group of RBs. Put another way, if the first RB set and the second RB set are both included in a same RB group, the UE 115-b may allocate the one or more RBs associated with the guard band between the first RB set and the second RB set to the same RB group.

Alternatively, if the first RB set and the second RB set are allocated into separate RB groups, the UE 115-b may allocate the one or more RBs associated with the guard band into one of the first RB group or the second RB group. For example, the first RB set may belong to the first group of RBs and the second RB set may belong to the second group of RBs. The UE 115-b may allocate the one or more RBs associated with the guard band into a fixed (e.g., preconfigured or predetermined) group of RBs, e.g., either the first group of RBs or the second group of RBs. In another example, the UE 115-b may allocate the one or more RBs associated with the guard band based on a total quantity of RBs of the first group of RBs and a total quantity of RBs of the second group of RBs. Here, the UE 115-b may allocate the one or more RBs associated with the guard band to the group of RBs having the smallest total quantity of RBs. For example, the first group of RBs may have fewer total RBs than the second group of RBs, and the UE 115-b may allocate the one or more RBs associated with the guard band to the first group of RBs.

In yet another example, when the first RB set and the second RB set are allocated into separate RB groups, the UE 115-b may split (e.g., evenly distribute) the one or more RBs associated with the guard band between the first RB group and the second RB group. For example, the UE 115-b may allocate a first portion of the one or more RBs associated with the guard band to the first RB group and may allocate a second portion of the one or more RBs associated with the guard band to the second RB group.

Alternatively, in some cases, the UE 115-b may drop the one or more RBs associated with the guard band from the set of RBs allocated for the FDM uplink shared channel message. For example, if the first RB set belongs to the first group of RBs and the second RB set belongs to the second group of RBs, the UE 115-b may remove the one or more RBs associated with the guard band from the set of RBs. That is, the UE 115-b may refrain from transmitting the FDM uplink shared channel message on the one or more RBs associated with the guard band.

At 630, the UE 115-b may transmit, and the network entity 105-c may receive, the FDM uplink shared channel message including the first group of RBs and the second group of RBs based on the allocating (e.g., performed at 620 and, optionally, at 625). For example, the UE 115-b may transmit, and the network entity 105-c may receive, the first group of RBs in accordance with a first set of transmission parameters and the second group of RBs in accordance with a second set of transmission parameters. The first set of transmission parameters and the second set of transmission parameters may be those indicated in the control signaling at 605. For example, the first set of transmission parameters may be associated with the first SRI and the first SRS resource set, and the second set of transmission parameters may be associated with the second SRI and the second SRS resource set.

In some examples, the UE 115-b may transmit, and the network entity 105-c may receive, the first group of RBs and the second group of RBs according to a joint rate matching scheme, such that the first group of RBs and the second group of RBs are both associated with a same redundancy version. In other examples, the first group of RBs may be associated with a first rate matching scheme and a first redundancy version (e.g., associated with a transport block of the FDM uplink shared channel message) and the second group of RBs may be associated with a second rate matching scheme and a second redundancy version (e.g., associated with a transport block of the FDM uplink shared channel message). In such examples, the UE 115-*b* may transmit, and the network entity 105-*c* may receive, a first repetition of the transport block in the first group of RBs based on the first redundancy version and a second repetition of the transport block in the second group of RBs based on the second redundancy version.

Figure 7:
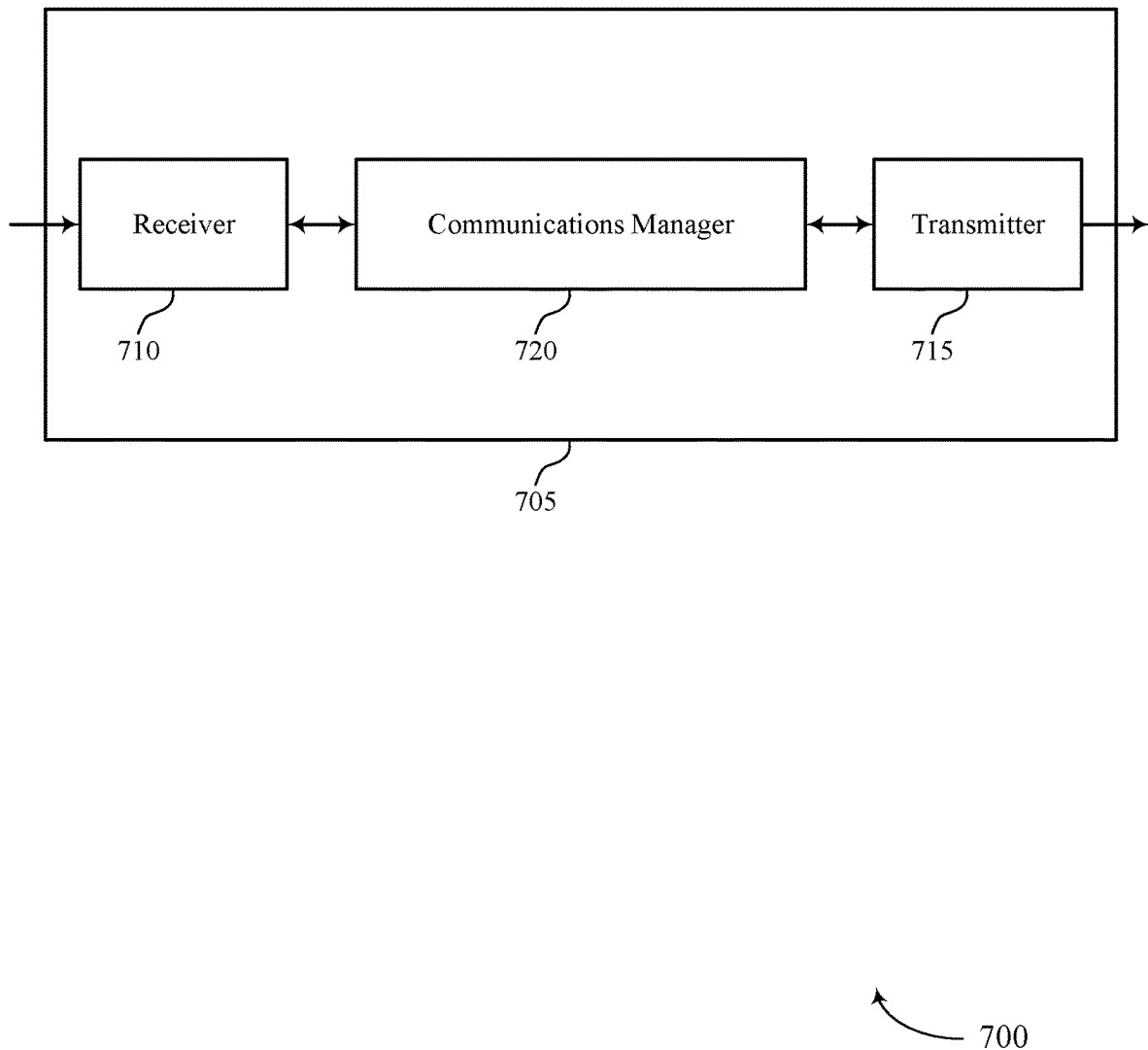
FIGS. 7 and 8 show block diagrams of devices that support FDM for uplink shared channel transmissions with interlaced RB allocation in accordance with one or more aspects of the present disclosure.

FIG. 7 shows a block diagram 700 of a device 705 that supports FDM for uplink shared channel transmissions with interlaced RB allocation in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to FDM for uplink shared channel transmissions with interlaced RB allocation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to FDM for uplink shared channel transmissions with interlaced RB allocation). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of FDM for uplink shared channel transmissions with interlaced RB allocation as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. For example, the communications manager 720 may be configured as or otherwise support a means for receiving control signaling scheduling an FDM uplink shared channel message, the control signaling including a resource allocation for a set of multiple RBs, where the resource allocation includes an indication of an interlace assignment and an RB set assignment. The communications manager 720 may be configured as or otherwise support a means for allocating, according to a rule, the set of multiple RBs into a first group of RBs and a second group of RBs based on the interlace assignment and the RB set assignment. The communications manager 720 may be configured as or otherwise support a means for transmitting the FDM uplink shared channel message including the first group of RBs and the second group of RBs based on the allocating, where the first group of RBs is transmitted in accordance with a first set of transmission parameters and the second group of RBs is transmitted in accordance with a second set of transmission parameters different from the first set of transmission parameters.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for FDM operations for uplink shared channel transmissions with interlaced RB allocations, which may provide for reduced processing and reduced power consumption at the device 705. FDM transmissions may further support more efficient utilization of communication resources at the device 705.

Figure 8:
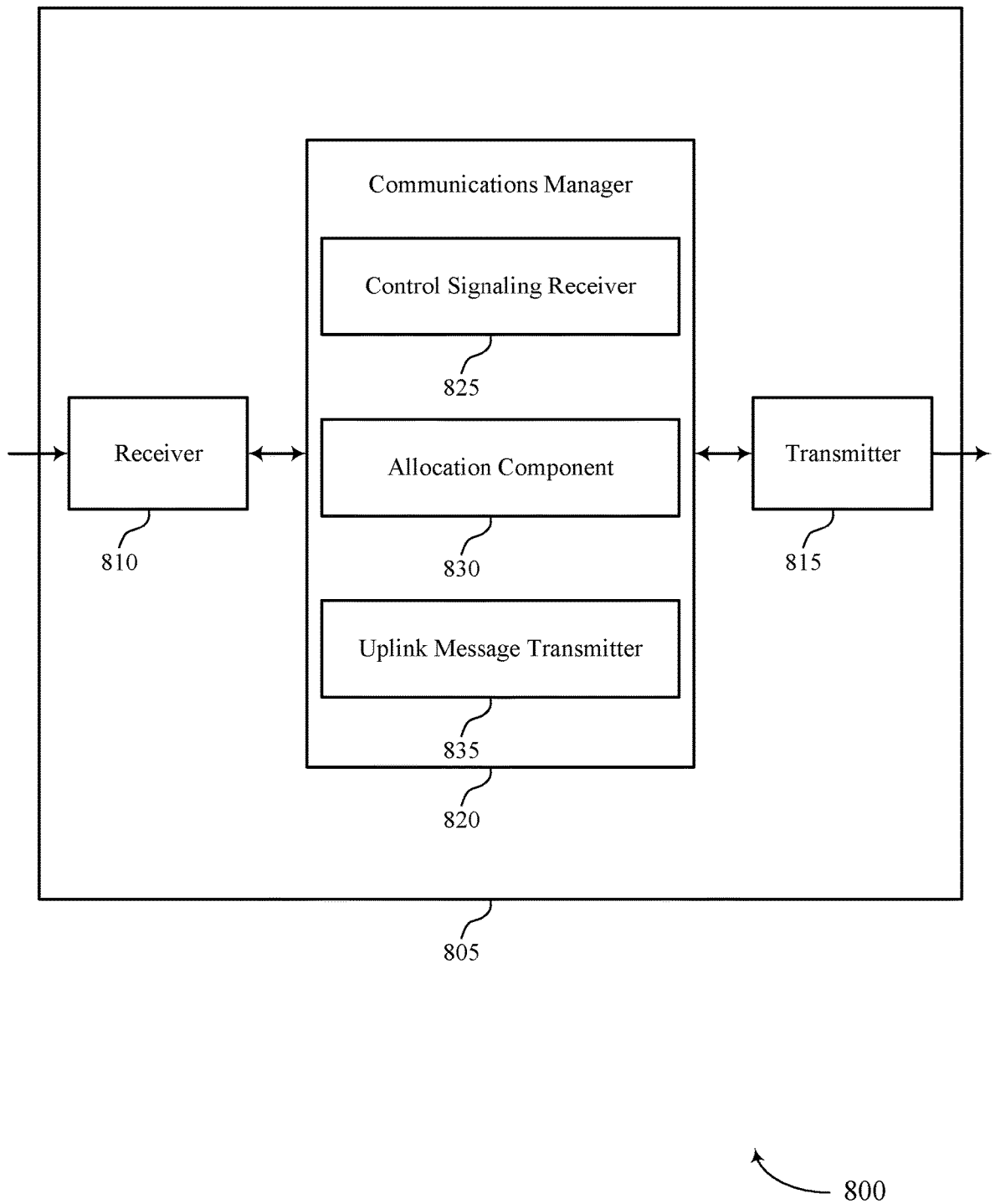

FIG. 8 shows a block diagram 800 of a device 805 that supports FDM for uplink shared channel transmissions with interlaced RB allocation in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to FDM for uplink shared channel transmissions with interlaced RB allocation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to FDM for uplink shared channel transmissions with interlaced RB allocation). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of FDM for uplink shared channel transmissions with interlaced RB allocation as described herein. For example, the communications manager 820 may include a control signaling receiver 825, an allocation component 830, an uplink message transmitter 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. The control signaling receiver 825 may be configured as or otherwise support a means for receiving control signaling scheduling an FDM uplink shared channel message, the control signaling including a resource allocation for a set of multiple RBs, where the resource allocation includes an indication of an interlace assignment and an RB set assignment. The allocation component 830 may be configured as or otherwise support a means for allocating, according to a rule, the set of multiple RBs into a first group of RBs and a second group of RBs based on the interlace assignment and the RB set assignment. The uplink message transmitter 835 may be configured as or otherwise support a means for transmitting the FDM uplink shared channel message including the first group of RBs and the second group of RBs based on the allocating, where the first group of RBs is transmitted in accordance with a first set of transmission parameters and the second group of RBs is transmitted in accordance with a second set of transmission parameters different from the first set of transmission parameters.

Figure 9:
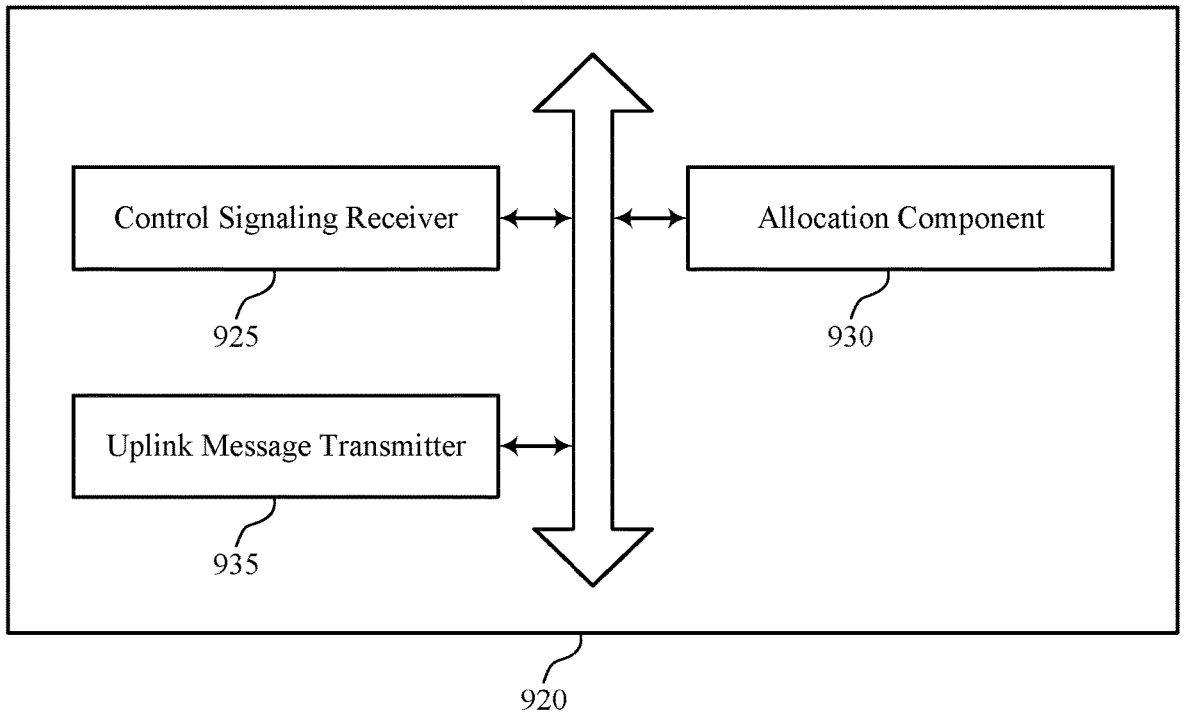
FIG. 9 shows a block diagram of a communications manager that supports FDM for uplink shared channel transmissions with interlaced RB allocation in accordance with one or more aspects of the present disclosure.

FIG. 9 shows a block diagram 900 of a communications manager 920 that supports FDM for uplink shared channel transmissions with interlaced RB allocation in accordance with one or more aspects of the present disclosure. The communications manager 920 may be an example of aspects of a communications manager 720, a communications manager 820, or both, as described herein. The communications manager 920, or various components thereof, may be an example of means for performing various aspects of FDM for uplink shared channel transmissions with interlaced RB allocation as described herein. For example, the communications manager 920 may include a control signaling receiver 925, an allocation component 930, an uplink message transmitter 935, or any combination thereof. Each of these components may communicate, directly or indirectly, with one another (e.g., via one or more buses).

The communications manager 920 may support wireless communications at a UE in accordance with examples as disclosed herein. The control signaling receiver 925 may be configured as or otherwise support a means for receiving control signaling scheduling an FDM uplink shared channel message, the control signaling including a resource allocation for a set of multiple RBs, where the resource allocation includes an indication of an interlace assignment and an RB set assignment. The allocation component 930 may be configured as or otherwise support a means for allocating, according to a rule, the set of multiple RBs into a first group of RBs and a second group of RBs based on the interlace assignment and the RB set assignment. The uplink message transmitter 935 may be configured as or otherwise support a means for transmitting the FDM uplink shared channel message including the first group of RBs and the second group of RBs based on the allocating, where the first group of RBs is transmitted in accordance with a first set of transmission parameters and the second group of RBs is transmitted in accordance with a second set of transmission parameters different from the first set of transmission parameters.

In some examples, to support allocating according to the rule, the allocation component 930 may be configured as or otherwise support a means for allocating the set of multiple RBs into the first group of RBs and the second group of RBs based on a quantity of interlaces indicated in the interlace assignment. In some examples, the first group of RBs includes a first subset of interlaces of the quantity of interlaces and the second group of RBs includes a second subset of interlaces of the quantity of interlaces. In some examples, both the first group of RBs and the second group of RBs are associated with one or more RB sets indicated in the RB set assignment.

In some examples, to support allocating according to the rule, the allocation component 930 may be configured as or otherwise support a means for allocating the set of multiple RBs into the first group of RBs and the second group of RBs based on a quantity of RB sets indicated in the RB set assignment. In some examples, the first group of RBs includes a first subset of RB sets of the quantity of RB sets and the second group of RBs includes a second subset of RB sets of the quantity of RB sets. In some examples, both the first group of RBs and the second group of RBs are associated with one or more interlaces indicated in the interlace assignment.

In some examples, the first group of RBs includes a first RB set and a second RB set that are adjacent in a frequency domain, the first group of RBs further including one or more RBs associated with a guard band between the first RB set and the second RB set based on the RB set assignment.

In some examples, the RB set assignment indicates one or more RBs associated with a guard band between a first RB set included in the first group of RBs and a second RB set included in the second group of RBs, the first RB set and the second RB set being adjacent in a frequency domain.

In some examples, the allocation component 930 may be configured as or otherwise support a means for dropping the one or more RBs associated with the guard band from the allocated set of multiple RBs based on the first group of RBs and the second group of RBs.

In some examples, the allocation component 930 may be configured as or otherwise support a means for allocating the one or more RBs associated with the guard band to the first group of RBs or the second group of RBs based on a total quantity of RBs of the first group of RBs and a total quantity of RBs of the second group of RBs.

In some examples, the allocation component 930 may be configured as or otherwise support a means for splitting the one or more RBs associated with the guard band between the first group of RBs and the second group of RBs.

In some examples, to support allocating according to the rule, the allocation component 930 may be configured as or otherwise support a means for allocating the set of multiple RBs into the first group of RBs and the second group of RBs based on a quantity of interlaces indicated in the interlace assignment and a quantity of RB sets indicated in the RB set assignment.

In some examples, the allocation component 930 may be configured as or otherwise support a means for allocating a first subset of interlaces of the quantity of interlaces to the first group of RBs and a second subset of interlaces of the quantity of interlaces to the second group of RBs based on the quantity of interlaces being an even number.

In some examples, the allocation component 930 may be configured as or otherwise support a means for allocating a first subset of interlaces of the quantity of interlaces to the first group of RBs and a second subset of interlaces of the quantity of interlaces to the second group of RBs based on the quantity of interlaces being greater than the quantity of RB sets.

In some examples, the allocation component 930 may be configured as or otherwise support a means for allocating a first subset of RB sets of the quantity of RB sets to the first group of RBs and a second subset of RB sets of the quantity of RB sets to the second group of RBs based on the quantity of RB sets being an even number.

In some examples, the allocation component 930 may be configured as or otherwise support a means for allocating a first subset of RB sets of the quantity of RB sets to the first group of RBs and a second subset of RB sets of the quantity of RB sets to the second group of RBs based on the quantity of RB sets being greater than the quantity of interlaces.

In some examples, the control signaling receiver 925 may be configured as or otherwise support a means for receiving second control signaling indicating the rule, where the allocating is based on the second control signaling.

In some examples, the first group of RBs and the first set of transmission parameters are associated with a first set of SRS resources, and the second group of RBs and the second set of transmission parameters are associated with a second set of SRS resources.

In some examples, to support transmitting the FDM uplink shared channel message, the uplink message transmitter 935 may be configured as or otherwise support a means for transmitting the first group of RBs and the second group of RBs according to a joint rate matching scheme.

In some examples, to support transmitting the FDM uplink shared channel message, the uplink message transmitter 935 may be configured as or otherwise support a means for transmitting a first repetition of a transport block in the first group of RBs based on a first redundancy version. In some examples, to support transmitting the FDM uplink shared channel message, the uplink message transmitter 935 may be configured as or otherwise support a means for transmitting a second repetition of the transport block in the second group of RBs based on a second redundancy version.

Figure 10:
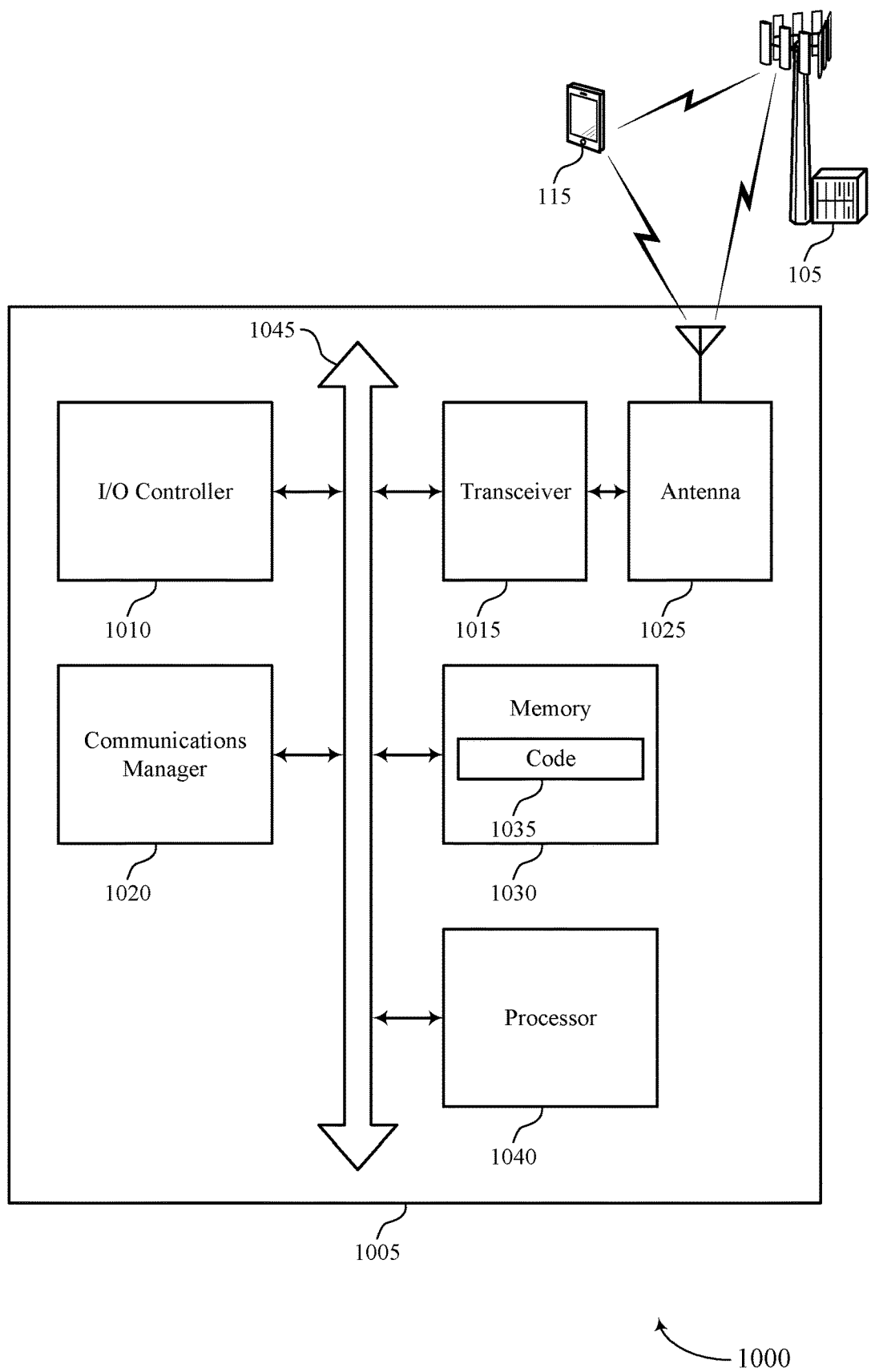
FIG. 10 shows a diagram of a system including a device that supports FDM for uplink shared channel transmissions with interlaced RB allocation in accordance with one or more aspects of the present disclosure.

FIG. 10 shows a diagram of a system 1000 including a device 1005 that supports FDM for uplink shared channel transmissions with interlaced RB allocation in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting FDM for uplink shared channel transmissions with interlaced RB allocation). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving control signaling scheduling an FDM uplink shared channel message, the control signaling including a resource allocation for a set of multiple RBs, where the resource allocation includes an indication of an interlace assignment and an RB set assignment. The communications manager 1020 may be configured as or otherwise support a means for allocating, according to a rule, the set of multiple RBs into a first group of RBs and a second group of RBs based on the interlace assignment and the RB set assignment. The communications manager 1020 may be configured as or otherwise support a means for transmitting the FDM uplink shared channel message including the first group of RBs and the second group of RBs based on the allocating, where the first group of RBs is transmitted in accordance with a first set of transmission parameters and the second group of RBs is transmitted in accordance with a second set of transmission parameters different from the first set of transmission parameters.

By including or configuring the communications manager 1020 in accordance with examples as described herein, the device 1005 may support techniques for FDM operations for uplink shared channel transmissions with interlaced RB allocations, which may provide for more efficient utilization of communication resources at the device 1005, thereby reducing system latency and improving throughput. FDM transmissions may be associated with improved frequency diversity and communications reliability, which may enable the device 1005 to avoid retransmissions associated with failed or unreliable communications and may further improve communications efficiency.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of FDM for uplink shared channel transmissions with interlaced RB allocation as described herein, or the processor 1040 and the memory 1030 may be otherwise configured to perform or support such operations.

Figure 11:
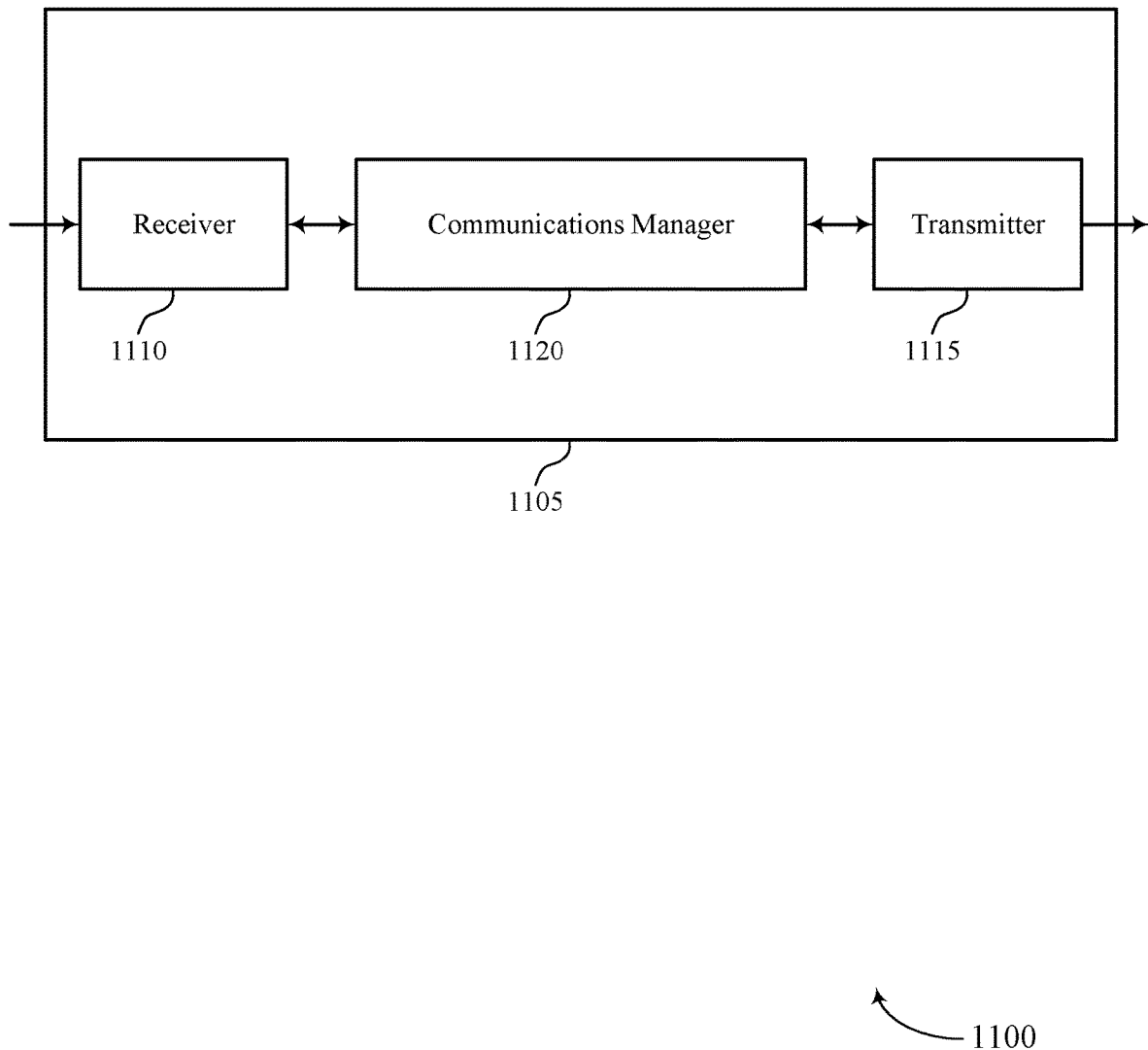
FIGS. 11 and 12 show block diagrams of devices that support FDM for uplink shared channel transmissions with interlaced RB allocation in accordance with one or more aspects of the present disclosure.

FIG. 11 shows a block diagram 1100 of a device 1105 that supports FDM for uplink shared channel transmissions with interlaced RB allocation in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of FDM for uplink shared channel transmissions with interlaced RB allocation as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. For example, the communications manager 1120 may be configured as or otherwise support a means for transmitting control signaling scheduling an FDM uplink shared channel message, the control signaling including a resource allocation for a set of multiple RBs, where the resource allocation includes an indication of an interlace assignment and an RB set assignment. The communications manager 1120 may be configured as or otherwise support a means for receiving the FDM uplink shared channel message including a first group of RBs of the set of multiple RBs and a second group of RBs of the set of multiple RBs based on the interlace assignment, the RB set assignment, and a rule, where the first group of RBs is received in accordance with a first set of transmission parameters and the second group of RBs is received in accordance with a second set of transmission parameters different from the first set of transmission parameters.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for FDM operations for uplink shared channel transmissions with interlaced RB allocations, which may provide for reduced processing, reduced power consumption, and more efficient utilization of communication resources.

Figure 12:
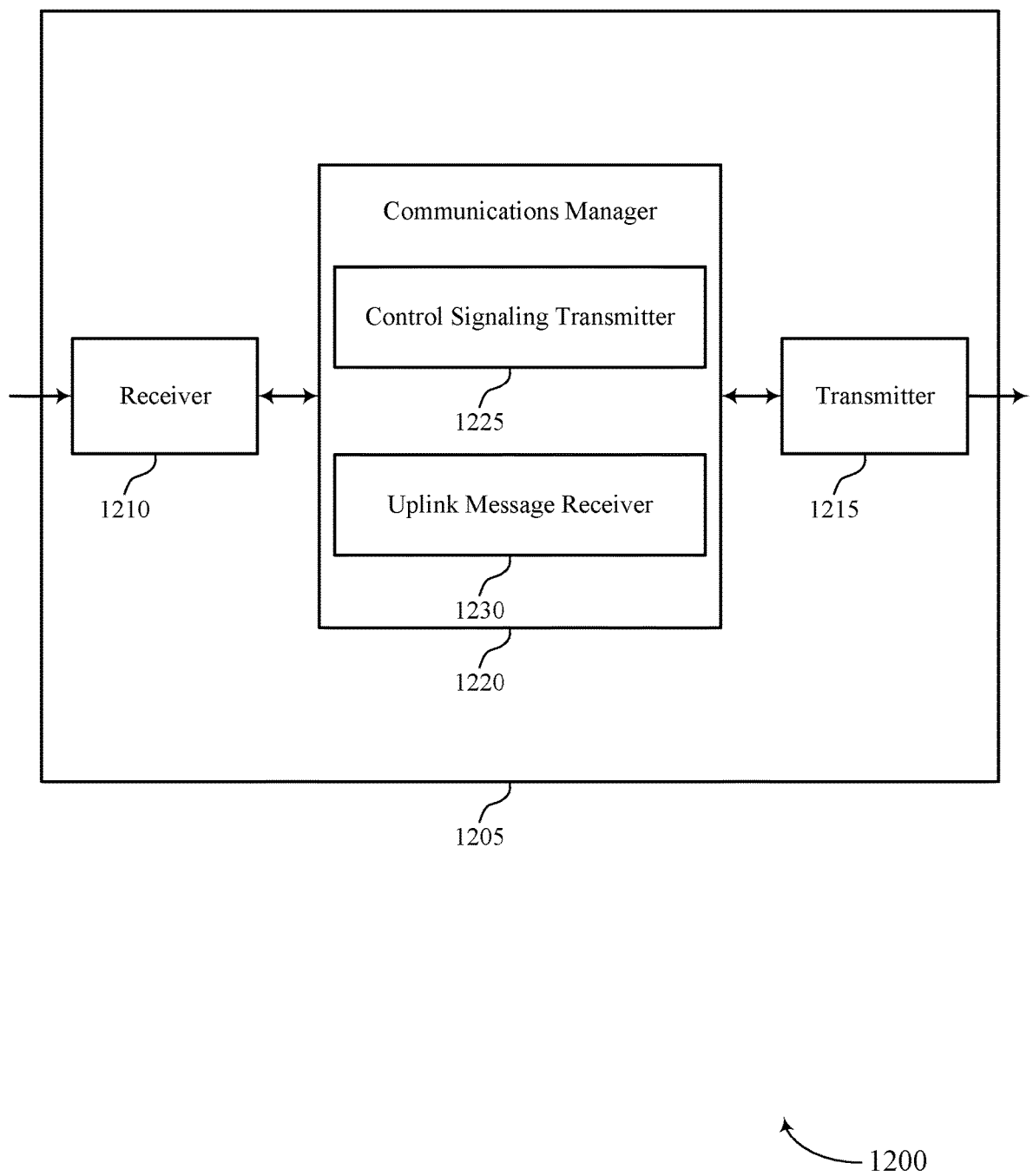

FIG. 12 shows a block diagram 1200 of a device 1205 that supports FDM for uplink shared channel transmissions with interlaced RB allocation in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of FDM for uplink shared channel transmissions with interlaced RB allocation as described herein. For example, the communications manager 1220 may include a control signaling transmitter 1225 an uplink message receiver 1230, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. The control signaling transmitter 1225 may be configured as or otherwise support a means for transmitting control signaling scheduling an FDM uplink shared channel message, the control signaling including a resource allocation for a set of multiple RBs, where the resource allocation includes an indication of an interlace assignment and an RB set assignment. The uplink message receiver 1230 may be configured as or otherwise support a means for receiving the FDM uplink shared channel message including a first group of RBs of the set of multiple RBs and a second group of RBs of the set of multiple RBs based on the interlace assignment, the RB set assignment, and a rule, where the first group of RBs is received in accordance with a first set of transmission parameters and the second group of RBs is received in accordance with a second set of transmission parameters different from the first set of transmission parameters.

Figure 13:
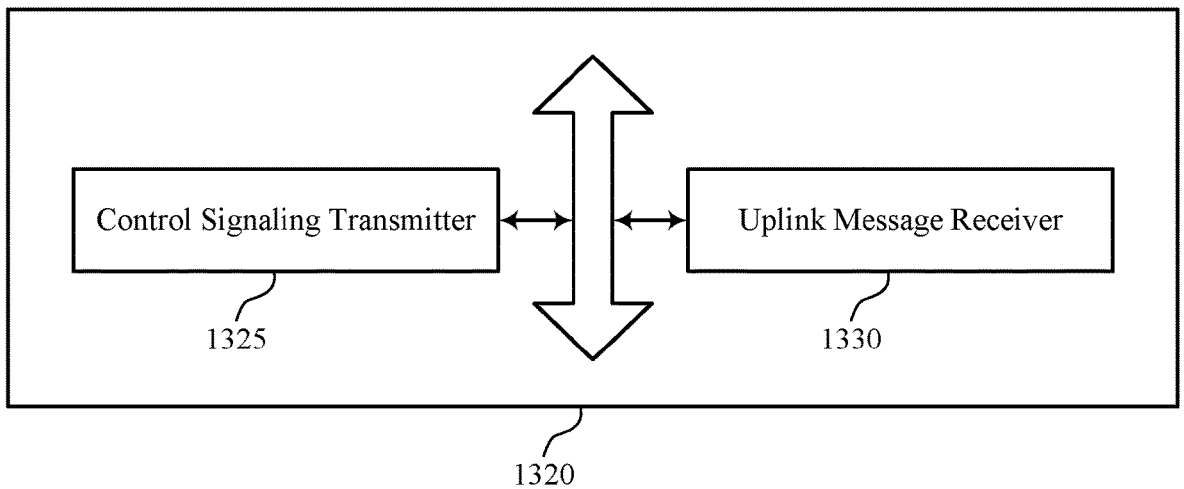
FIG. 13 shows a block diagram of a communications manager that supports FDM for uplink shared channel transmissions with interlaced RB allocation in accordance with one or more aspects of the present disclosure.

FIG. 13 shows a block diagram 1300 of a communications manager 1320 that supports FDM for uplink shared channel transmissions with interlaced RB allocation in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of FDM for uplink shared channel transmissions with interlaced RB allocation as described herein. For example, the communications manager 1320 may include a control signaling transmitter 1325 an uplink message receiver 1330, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications in accordance with examples as disclosed herein. The control signaling transmitter 1325 may be configured as or otherwise support a means for transmitting control signaling scheduling an FDM uplink shared channel message, the control signaling including a resource allocation for a set of multiple RBs, where the resource allocation includes an indication of an interlace assignment and an RB set assignment. The uplink message receiver 1330 may be configured as or otherwise support a means for receiving the FDM uplink shared channel message including a first group of RBs of the set of multiple RBs and a second group of RBs of the set of multiple RBs based on the interlace assignment, the RB set assignment, and a rule, where the first group of RBs is received in accordance with a first set of transmission parameters and the second group of RBs is received in accordance with a second set of transmission parameters different from the first set of transmission parameters. In some examples, the interlace assignment indicates a quantity of interlaces and the RB set assignment indicates a quantity of RB sets.

In some examples, the first group of RBs includes a first subset of interlaces of the quantity of interlaces and the second group of RBs includes a second subset of interlaces of the quantity of interlaces. In some examples, both the first group of RBs and the second group of RBs are associated with one or more RB sets indicated in the RB set assignment.

In some examples, the first group of RBs includes a first subset of RB sets of the quantity of RB sets and the second group of RBs includes a second subset of RB sets of the quantity of RB sets. In some examples, both the first group of RBs and the second group of RBs are associated with one or more interlaces indicated in the interlace assignment.

In some examples, the first group of RBs includes a first RB set and a second RB set that are adjacent in a frequency domain, the first group of RBs further including one or more RBs associated with a guard band between the first RB set and the second RB set based on the RB set assignment.

In some examples, the RB set assignment indicates one or more RBs associated with a guard band between a first RB set included in the first group of RBs and a second RB set included in the second group of RBs, the first RB set and the second RB set being adjacent in a frequency domain.

In some examples, the first group of RBs or the second group of RBs includes the one or more RBs associated with the guard band based on a total quantity of RBs of the first group of RBs and a total quantity of RBs of the second group of RBs. In some examples, the one or more RBs associated with the guard band are split between the first group of RBs and the second group of RBs.

In some examples, the control signaling transmitter 1325 may be configured as or otherwise support a means for transmitting second control signaling indicating the rule, where the FDM uplink shared channel message is received in accordance with the rule.

In some examples, the first group of RBs and the first set of transmission parameters are associated with a first set of SRS resources, and the second group of RBs and the second set of transmission parameters are associated with a second set of SRS resources.

In some examples, to support receiving the FDM uplink shared channel message, the uplink message receiver 1330 may be configured as or otherwise support a means for receiving the first group of RBs and the second group of RBs according to a joint rate matching scheme.

In some examples, to support receiving the FDM uplink shared channel message, the uplink message receiver 1330 may be configured as or otherwise support a means for receiving a first repetition of a transport block in the first group of RBs based on a first redundancy version. In some examples, to support receiving the FDM uplink shared channel message, the uplink message receiver 1330 may be configured as or otherwise support a means for receiving a second repetition of the transport block in the second group of RBs based on a second redundancy version.

Figure 14:
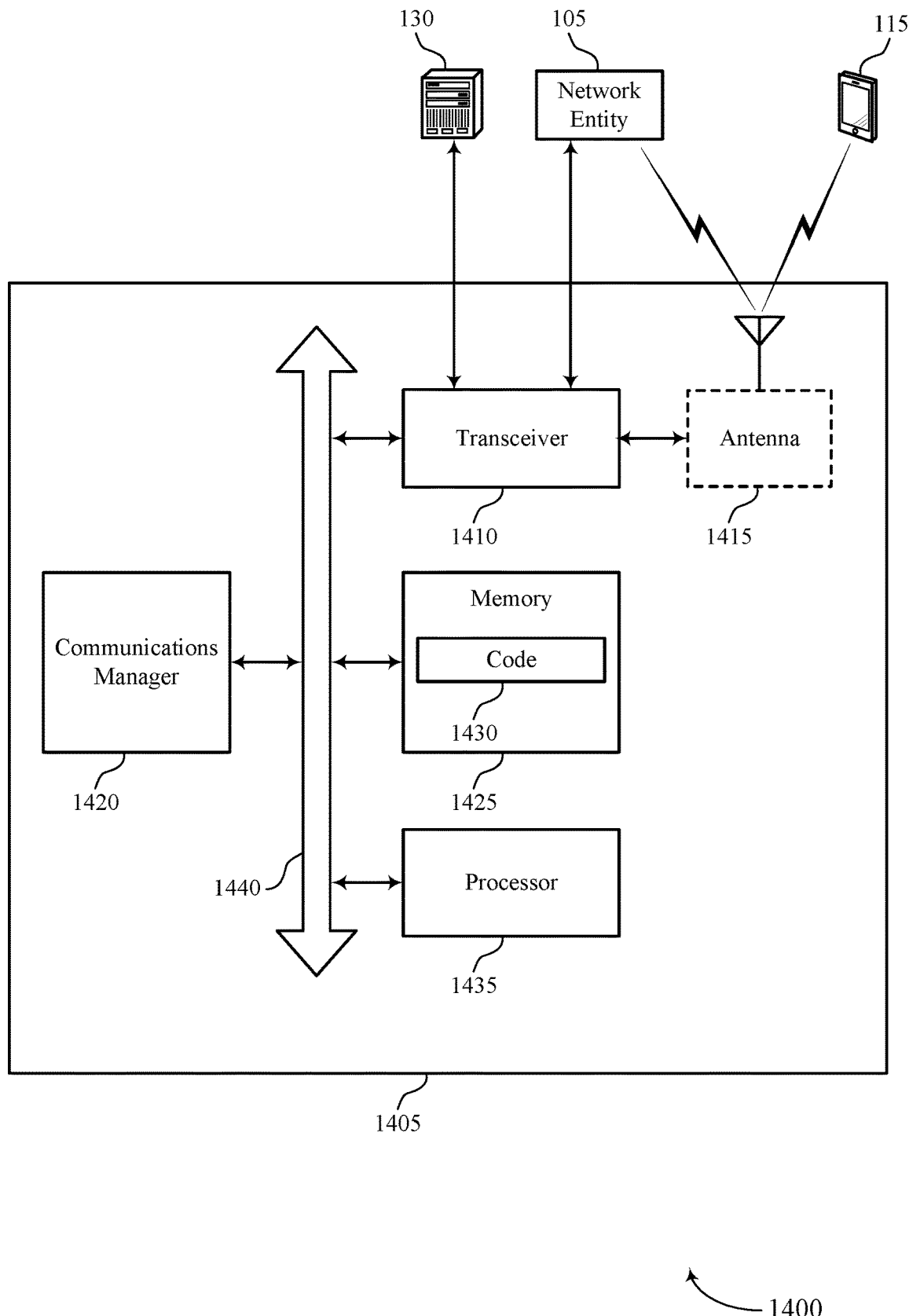
FIG. 14 shows a diagram of a system including a device that supports FDM for uplink shared channel transmissions with interlaced RB allocation in accordance with one or more aspects of the present disclosure.

FIG. 14 shows a diagram of a system 1400 including a device 1405 that supports FDM for uplink shared channel transmissions with interlaced RB allocation in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting FDM for uplink shared channel transmissions with interlaced RB allocation). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1405 may transmit information output from the chip or modem. In some implementations, the second interface may refer to an interface between the processing system of the chip or modem and a receiver, such that the device 1405 may obtain information or signal inputs, and the information may be passed to the processing system. A person having ordinary skill in the art will readily recognize that the first interface also may obtain information or signal inputs, and the second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications in accordance with examples as disclosed herein. For example, the communications manager 1420 may be configured as or otherwise support a means for transmitting control signaling scheduling an FDM uplink shared channel message, the control signaling including a resource allocation for a set of multiple RBs, where the resource allocation includes an indication of an interlace assignment and an RB set assignment. The communications manager 1420 may be configured as or otherwise support a means for receiving the FDM uplink shared channel message including a first group of RBs of the set of multiple RBs and a second group of RBs of the set of multiple RBs based on the interlace assignment, the RB set assignment, and a rule, where the first group of RBs is received in accordance with a first set of transmission parameters and the second group of RBs is received in accordance with a second set of transmission parameters different from the first set of transmission parameters.

By including or configuring the communications manager 1420 in accordance with examples as described herein, the device 1405 may support techniques for FDM operations for uplink shared channel transmissions with interlaced RB allocations, which may provide for more efficient utilization of communication resources, reducing system latency and improving throughput. FDM transmissions may be associated with improved frequency diversity and communications reliability, which may enable the device 1405 to avoid retransmissions associated with failed or unreliable communications and may further improve communications efficiency.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of FDM for uplink shared channel transmissions with interlaced RB allocation as described herein, or the processor 1435 and the memory 1425 may be otherwise configured to perform or support such operations.

FIG. 15 shows a flowchart illustrating a method 1500 that supports FDM for uplink shared channel transmissions with interlaced RB allocation in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving control signaling scheduling an FDM uplink shared channel message, the control signaling including a resource allocation for a set of multiple RBs, where the resource allocation includes an indication of an interlace assignment and an RB set assignment. The operations of 1505 may be performed in accordance with examples as disclosed herein. In some examples, aspects of the operations of 1505 may be performed by a control signaling receiver 925 as described with reference to FIG. 9.

At 1510, the method may include allocating, according to a rule, the set of multiple RBs into a first group of RBs and a second group of RBs based on the interlace assignment and the RB set assignment. The operations of 1510 may be performed in accordance with examples as disclosed herein. In some examples, aspects of the operations of 1510 may be performed by an allocation component 930 as described with reference to FIG. 9.

At 1515, the method may include transmitting the FDM uplink shared channel message including the first group of RBs and the second group of RBs based on the allocating, where the first group of RBs is transmitted in accordance with a first set of transmission parameters and the second group of RBs is transmitted in accordance with a second set of transmission parameters different from the first set of transmission parameters. The operations of 1515 may be performed in accordance with examples as disclosed herein. In some examples, aspects of the operations of 1515 may be performed by an uplink message transmitter 935 as described with reference to FIG. 9.

Figure 16:
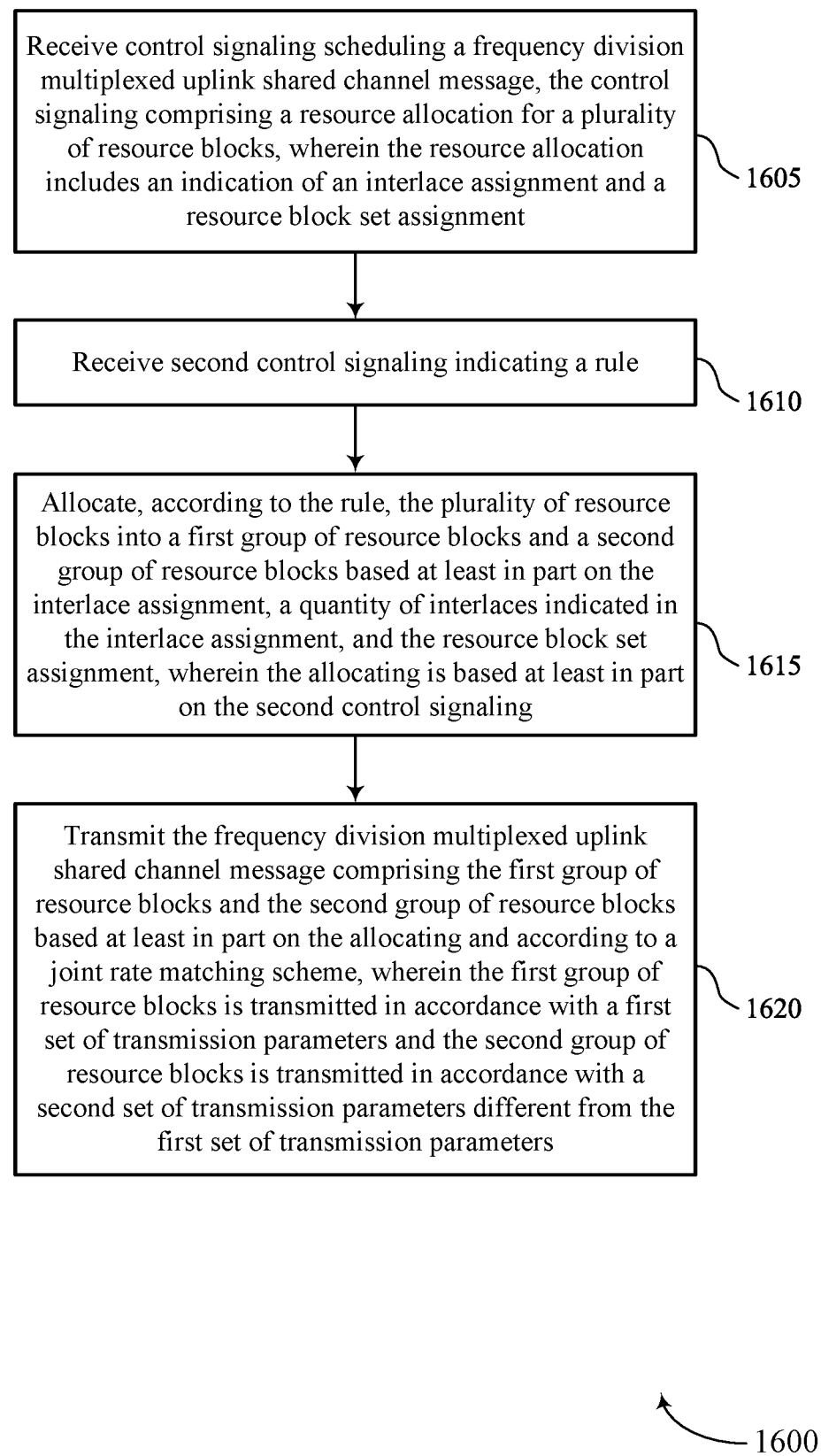

FIG. 16 shows a flowchart illustrating a method 1600 that supports FDM for uplink shared channel transmissions with interlaced RB allocation in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving control signaling scheduling an FDM uplink shared channel message, the control signaling including a resource allocation for a set of multiple RBs, where the resource allocation includes an indication of an interlace assignment and an RB set assignment. The operations of 1605 may be performed in accordance with examples as disclosed herein. In some examples, aspects of the operations of 1605 may be performed by a control signaling receiver 925 as described with reference to FIG. 9.

At 1610, the method may include receiving second control signaling indicating a rule. The operations of 1610 may be performed in accordance with examples as disclosed herein. In some examples, aspects of the operations of 1610 may be performed by a control signaling receiver 925 as described with reference to FIG. 9.

At 1615, the method may include allocating, according to the rule, the set of multiple RBs into a first group of RBs and a second group of RBs based on the interlace assignment, a quantity of interlaces indicated in the interlace assignment, and the RB set assignment. The allocating may be based on the second control signaling. The operations of 1615 may be performed in accordance with examples as disclosed herein. In some examples, aspects of the operations of 1615 may be performed by an allocation component 930 as described with reference to FIG. 9.

At 1620, the method may include transmitting the FDM uplink shared channel message including the first group of RBs and the second group of RBs based on the allocating and according to a joint rate matching scheme, where the first group of RBs is transmitted in accordance with a first set of transmission parameters and the second group of RBs is transmitted in accordance with a second set of transmission parameters different from the first set of transmission parameters. The operations of 1620 may be performed in accordance with examples as disclosed herein. In some examples, aspects of the operations of 1620 may be performed by an uplink message transmitter 935 as described with reference to FIG. 9.

Figure 17:
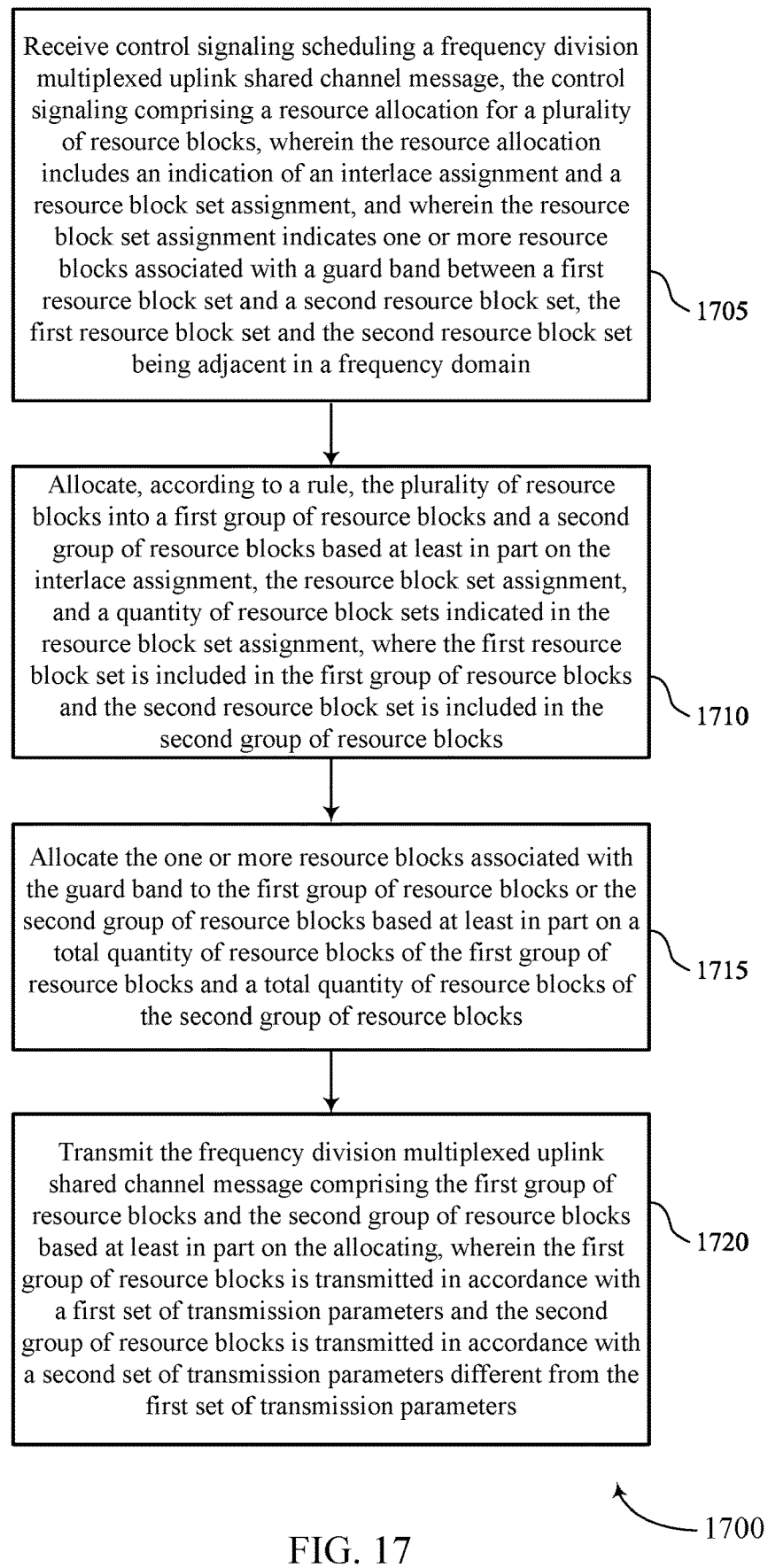

FIG. 17 shows a flowchart illustrating a method 1700 that supports FDM for uplink shared channel transmissions with interlaced RB allocation in accordance with one or more aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include receiving control signaling scheduling an FDM uplink shared channel message, the control signaling including a resource allocation for a set of multiple RBs, where the resource allocation includes an indication of an interlace assignment and an RB set assignment, and where the RB set assignment indicates one or more RBs associated with a guard band between a first RB set and a second RB set, the first RB set and the second RB set being adjacent in a frequency domain. The operations of 1705 may be performed in accordance with examples as disclosed herein. In some examples, aspects of the operations of 1705 may be performed by a control signaling receiver 925 as described with reference to FIG. 9.

At 1710, the method may include allocating, according to a rule, the set of multiple RBs into a first group of RBs and a second group of RBs based on the interlace assignment, the RB set assignment, and a quantity of RB sets indicated in the RB set assignment, where the first RB set is included in the first group of RBs and the second RB set is included in the second group of RBs. The operations of 1710 may be performed in accordance with examples as disclosed herein. In some examples, aspects of the operations of 1710 may be performed by an allocation component 930 as described with reference to FIG. 9.

At 1715, the method may include allocating the one or more RBs associated with the guard band to the first group of RBs or the second group of RBs based on a total quantity of RBs of the first group of RBs and a total quantity of RBs of the second group of RBs. The operations of 1715 may be performed in accordance with examples as disclosed herein. In some examples, aspects of the operations of 1715 may be performed by an allocation component 930 as described with reference to FIG. 9.

At 1720, the method may include transmitting the FDM uplink shared channel message including the first group of RBs and the second group of RBs based on the allocating, where the first group of RBs is transmitted in accordance with a first set of transmission parameters and the second group of RBs is transmitted in accordance with a second set of transmission parameters different from the first set of transmission parameters. The operations of 1720 may be performed in accordance with examples as disclosed herein. In some examples, aspects of the operations of 1720 may be performed by an uplink message transmitter 935 as described with reference to FIG. 9.

Figure 18:
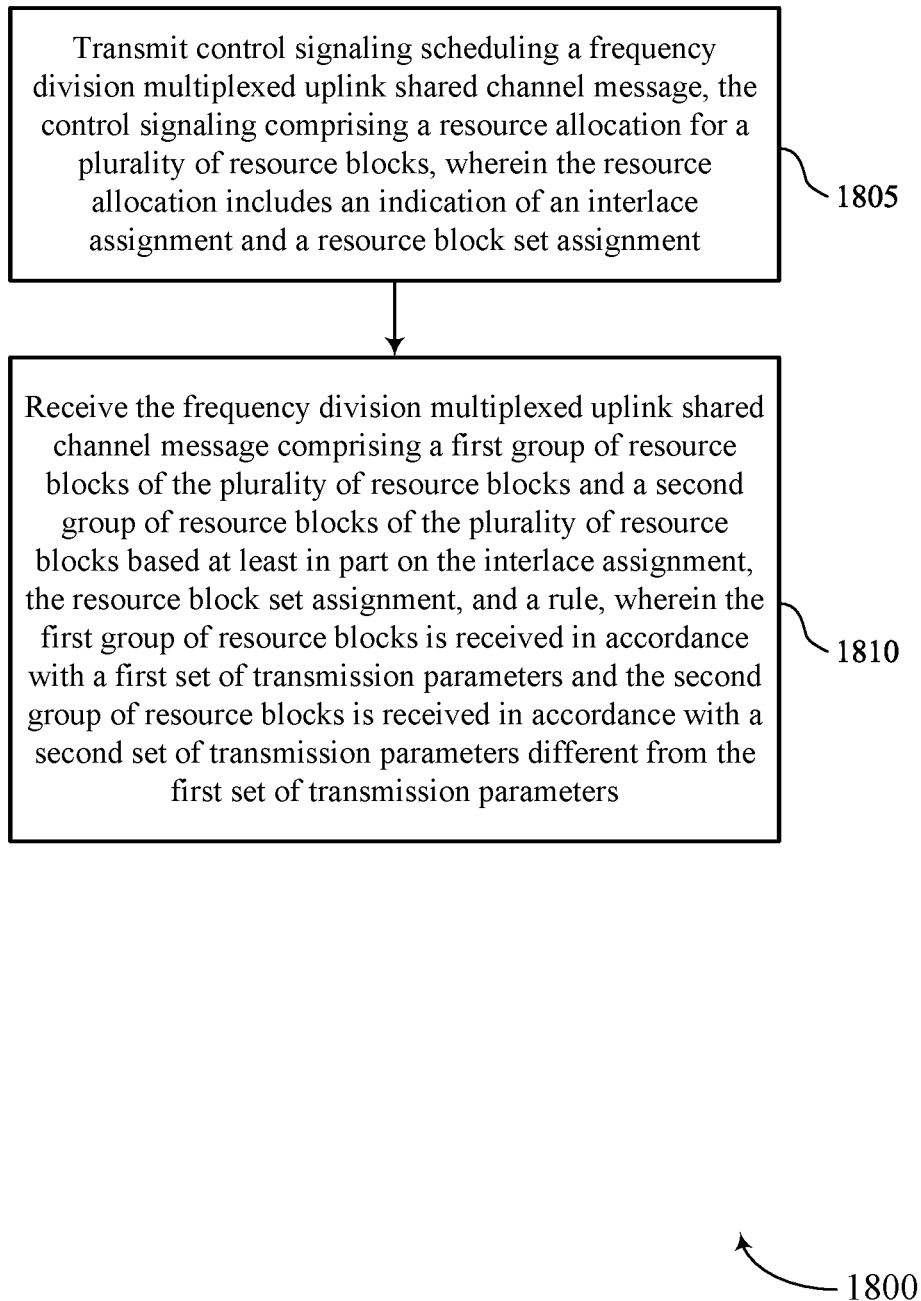

FIG. 18 shows a flowchart illustrating a method 1800 that supports FDM for uplink shared channel transmissions with interlaced RB allocation in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include transmitting control signaling scheduling an FDM uplink shared channel message, the control signaling including a resource allocation for a set of multiple RBs, where the resource allocation includes an indication of an interlace assignment and an RB set assignment. The operations of 1805 may be performed in accordance with examples as disclosed herein. In some examples, aspects of the operations of 1805 may be performed by a control signaling transmitter 1325 as described with reference to FIG. 13.

At 1810, the method may include receiving the FDM uplink shared channel message including a first group of RBs of the set of multiple RBs and a second group of RBs of the set of multiple RBs based on the interlace assignment, the RB set assignment, and a rule, where the first group of RBs is received in accordance with a first set of transmission parameters and the second group of RBs is received in accordance with a second set of transmission parameters different from the first set of transmission parameters. The operations of 1810 may be performed in accordance with examples as disclosed herein. In some examples, aspects of the operations of 1810 may be performed by an uplink message receiver 1330 as described with reference to FIG. 13.

The following provides an overview of aspects of the present disclosure:

Aspect 1: A method for wireless communications at a UE, comprising: receiving control signaling scheduling an FDM uplink shared channel message, the control signaling comprising a resource allocation for a plurality of RBs, wherein the resource allocation includes an indication of an interlace assignment and an RB set assignment; allocating, according to a rule, the plurality of RBs into a first group of RBs and a second group of RBs based at least in part on the interlace assignment and the RB set assignment; and transmitting the FDM uplink shared channel message comprising the first group of RBs and the second group of RBs based at least in part on the allocating, wherein the first group of RBs is transmitted in accordance with a first set of transmission parameters and the second group of RBs is transmitted in accordance with a second set of transmission parameters different from the first set of transmission parameters.

Aspect 2: The method of aspect 1, wherein allocating according to the rule comprises: allocating the plurality of RBs into the first group of RBs and the second group of RBs based at least in part on a quantity of interlaces indicated in the interlace assignment.

Aspect 3: The method of aspect 2, wherein the first group of RBs comprises a first subset of interlaces of the quantity of interlaces and the second group of RBs comprises a second subset of interlaces of the quantity of interlaces.

Aspect 4: The method of aspect 3, wherein both the first group of RBs and the second group of RBs are associated with one or more RB sets indicated in the RB set assignment.

Aspect 5: The method of aspect 1, wherein allocating according to the rule comprises: allocating the plurality of RBs into the first group of RBs and the second group of RBs based at least in part on a quantity of RB sets indicated in the RB set assignment.

Aspect 6: The method of aspect 5, wherein the first group of RBs comprises a first subset of RB sets of the quantity of RB sets and the second group of RBs comprises a second subset of RB sets of the quantity of RB sets.

Aspect 7: The method of aspect 6, wherein both the first group of RBs and the second group of RBs are associated with one or more interlaces indicated in the interlace assignment.

Aspect 8: The method of any of aspects 5 through 7, wherein the first group of RBs includes a first RB set and a second RB set that are adjacent in a frequency domain, the first group of RBs further including one or more RBs associated with a guard band between the first RB set and the second RB set based at least in part on the RB set assignment.

Aspect 9: The method of any of aspects 5 through 8, wherein the RB set assignment indicates one or more RBs associated with a guard band between a first RB set included in the first group of RBs and a second RB set included in the second group of RBs, the first RB set and the second RB set being adjacent in a frequency domain.

Aspect 10: The method of aspect 9, further comprising: dropping the one or more RBs associated with the guard band from the allocated plurality of RBs based at least in part on the first group of RBs and the second group of RBs.

Aspect 11: The method of aspect 9, further comprising: allocating the one or more RBs associated with the guard band to the first group of RBs or the second group of RBs based at least in part on a total quantity of RBs of the first group of RBs and a total quantity of RBs of the second group of RBs.

Aspect 12: The method of aspect 9, further comprising: splitting the one or more RBs associated with the guard band between the first group of RBs and the second group of RBs.

Aspect 13: The method of aspect 1, wherein allocating according to the rule comprises: allocating the plurality of RBs into the first group of RBs and the second group of RBs based at least in part on a quantity of interlaces indicated in the interlace assignment and a quantity of RB sets indicated in the RB set assignment.

Aspect 14: The method of aspect 13, further comprising: allocating a first subset of interlaces of the quantity of interlaces to the first group of RBs and a second subset of interlaces of the quantity of interlaces to the second group of RBs based at least in part on the quantity of interlaces being an even number.

Aspect 15: The method of aspect 13, further comprising: allocating a first subset of interlaces of the quantity of interlaces to the first group of RBs and a second subset of interlaces of the quantity of interlaces to the second group of RBs based at least in part on the quantity of interlaces being greater than the quantity of RB sets.

Aspect 16: The method of aspect 13, further comprising: allocating a first subset of RB sets of the quantity of RB sets to the first group of RBs and a second subset of RB sets of the quantity of RB sets to the second group of RBs based at least in part on the quantity of RB sets being an even number.

Aspect 17: The method of aspect 13, further comprising: allocating a first subset of RB sets of the quantity of RB sets to the first group of RBs and a second subset of RB sets of the quantity of RB sets to the second group of RBs based at least in part on the quantity of RB sets being greater than the quantity of interlaces.

Aspect 18: The method of any of aspects 1 through 17, further comprising: receiving second control signaling indicating the rule, wherein the allocating is based at least in part on the second control signaling.

Aspect 19: The method of any of aspects 1 through 18, wherein the first group of RBs and the first set of transmission parameters are associated with a first set of SRS resources, and the second group of RBs and the second set of transmission parameters are associated with a second set of SRS resources.

Aspect 20: The method of any of aspects 1 through 19, wherein transmitting the FDM uplink shared channel message further comprises: transmitting the first group of RBs and the second group of RBs according to a joint rate matching scheme.

Aspect 21: The method of any of aspects 1 through 20, wherein transmitting the FDM uplink shared channel message further comprises: transmitting a first repetition of a transport block in the first group of RBs based at least in part on a first redundancy version; and transmitting a second repetition of the transport block in the second group of RBs based at least in part on a second redundancy version.

Aspect 22: A method for wireless communications, comprising: transmitting control signaling scheduling an FDM uplink shared channel message, the control signaling comprising a resource allocation for a plurality of RBs, wherein the resource allocation includes an indication of an interlace assignment and an RB set assignment; and receiving the FDM uplink shared channel message comprising a first group of RBs of the plurality of RBs and a second group of RBs of the plurality of RBs based at least in part on the interlace assignment, the RB set assignment, and a rule, wherein the first group of RBs is received in accordance with a first set of transmission parameters and the second group of RBs is received in accordance with a second set of transmission parameters different from the first set of transmission parameters.

Aspect 23: The method of aspect 22, wherein the interlace assignment indicates a quantity of interlaces and the RB set assignment indicates a quantity of RB sets.

Aspect 24: The method of aspect 23, wherein the first group of RBs comprises a first subset of interlaces of the quantity of interlaces and the second group of RBs comprises a second subset of interlaces of the quantity of interlaces.

Aspect 25: The method of aspect 24, wherein both the first group of RBs and the second group of RBs are associated with one or more RB sets indicated in the RB set assignment.

Aspect 26: The method of aspect 23, wherein the first group of RBs comprises a first subset of RB sets of the quantity of RB sets and the second group of RBs comprises a second subset of RB sets of the quantity of RB sets.

Aspect 27: The method of aspect 26, wherein both the first group of RBs and the second group of RBs are associated with one or more interlaces indicated in the interlace assignment.

Aspect 28: The method of any of aspects 26 through 27, wherein the first group of RBs includes a first RB set and a second RB set that are adjacent in a frequency domain, the first group of RBs further including one or more RBs associated with a guard band between the first RB set and the second RB set based at least in part on the RB set assignment.

Aspect 29: The method of any of aspects 26 through 27, wherein the RB set assignment indicates one or more RBs associated with a guard band between a first RB set included in the first group of RBs and a second RB set included in the second group of RBs, the first RB set and the second RB set being adjacent in a frequency domain.

Aspect 30: The method of aspect 29, wherein the first group of RBs or the second group of RBs includes the one or more RBs associated with the guard band based at least in part on a total quantity of RBs of the first group of RBs and a total quantity of RBs of the second group of RBs.

Aspect 31: The method of aspect 29, wherein the one or more RBs associated with the guard band are split between the first group of RBs and the second group of RBs.

Aspect 32: The method of any of aspects 22 through 31, further comprising: transmitting second control signaling indicating the rule, wherein the FDM uplink shared channel message is received in accordance with the rule.

Aspect 33: The method of any of aspects 22 through 32, wherein the first group of RBs and the first set of transmission parameters are associated with a first set of SRS resources, and the second group of RBs and the second set of transmission parameters are associated with a second set of SRS resources.

Aspect 34: The method of any of aspects 22 through 33, wherein receiving the FDM uplink shared channel message further comprises: receiving the first group of RBs and the second group of RBs according to a joint rate matching scheme.

Aspect 35: The method of any of aspects 22 through 34, wherein receiving the FDM uplink shared channel message further comprises: receiving a first repetition of a transport block in the first group of RBs based at least in part on a first redundancy version; and receiving a second repetition of the transport block in the second group of RBs based at least in part on a second redundancy version.

Aspect 36: An apparatus for wireless communications at a UE, comprising a processor; memory coupled with the processor; and instructions stored in the memory and executable by the processor to cause the apparatus to perform a method of any of aspects 1 through 21.

Aspect 37: An apparatus for wireless communications at a UE, comprising at least one means for performing a method of any of aspects 1 through 21.

Aspect 38: A non-transitory computer-readable medium storing code for wireless communications at a UE, the code comprising instructions executable by a processor to perform a method of any of aspects 1 through 21.

Aspect 39: An apparatus for wireless communications, comprising a processor; memory coupled with the processor; and instructions stored in the memory and executable by the processor to cause the apparatus to perform a method of any of aspects 22 through 35.

Aspect 40: An apparatus for wireless communications, comprising at least one means for performing a method of any of aspects 22 through 35.

Aspect 41: A non-transitory computer-readable medium storing code for wireless communications, the code comprising instructions executable by a processor to perform a method of any of aspects 22 through 35.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving control signaling scheduling a frequency division multiplexed uplink shared channel message, the control signaling comprising a resource allocation for a plurality of resource blocks, wherein the resource allocation includes an indication of an interlace assignment and a resource block set assignment;
   allocating, according to a rule, the plurality of resource blocks into a first group of resource blocks and a second group of resource blocks based at least in part on the interlace assignment and the resource block set assignment; and
   transmitting the frequency division multiplexed uplink shared channel message comprising the first group of resource blocks and the second group of resource blocks based at least in part on the allocating, wherein the first group of resource blocks is transmitted in accordance with a first set of transmission parameters and the second group of resource blocks is transmitted in accordance with a second set of transmission parameters different from the first set of transmission parameters.

2. The method of claim 1, wherein allocating according to the rule comprises:
   allocating the plurality of resource blocks into the first group of resource blocks and the second group of resource blocks based at least in part on a quantity of interlaces indicated in the interlace assignment.

3. The method of claim 2, wherein the first group of resource blocks comprises a first subset of interlaces of the quantity of interlaces and the second group of resource blocks comprises a second subset of interlaces of the quantity of interlaces.

4. The method of claim 3, wherein both the first group of resource blocks and the second group of resource blocks are associated with one or more resource block sets indicated in the resource block set assignment.

5. The method of claim 1, wherein allocating according to the rule comprises:
   allocating the plurality of resource blocks into the first group of resource blocks and the second group of resource blocks based at least in part on a quantity of resource block sets indicated in the resource block set assignment.

6. The method of claim 5, wherein the first group of resource blocks comprises a first subset of resource block sets of the quantity of resource block sets and the second group of resource blocks comprises a second subset of resource block sets of the quantity of resource block sets.

7. The method of claim 6, wherein both the first group of resource blocks and the second group of resource blocks are associated with one or more interlaces indicated in the interlace assignment.

8. The method of claim 5, wherein the first group of resource blocks includes a first resource block set and a second resource block set that are adjacent in a frequency domain, the first group of resource blocks further including one or more resource blocks associated with a guard band between the first resource block set and the second resource block set based at least in part on the resource block set assignment.

9. The method of claim 5, wherein the resource block set assignment indicates one or more resource blocks associated with a guard band between a first resource block set included in the first group of resource blocks and a second resource block set included in the second group of resource blocks, the first resource block set and the second resource block set being adjacent in a frequency domain.

10. The method of claim 9, further comprising:
dropping the one or more resource blocks associated with the guard band from the allocated plurality of resource blocks based at least in part on the first group of resource blocks and the second group of resource blocks.

11. The method of claim 9, further comprising:
allocating the one or more resource blocks associated with the guard band to the first group of resource blocks or the second group of resource blocks based at least in part on a total quantity of resource blocks of the first group of resource blocks and a total quantity of resource blocks of the second group of resource blocks.

12. The method of claim 9, further comprising:
splitting the one or more resource blocks associated with the guard band between the first group of resource blocks and the second group of resource blocks.

13. The method of claim 1, wherein allocating according to the rule comprises:
allocating the plurality of resource blocks into the first group of resource blocks and the second group of resource blocks based at least in part on a quantity of interlaces indicated in the interlace assignment and a quantity of resource block sets indicated in the resource block set assignment.

14. The method of claim 13, further comprising:
allocating a first subset of interlaces of the quantity of interlaces to the first group of resource blocks and a second subset of interlaces of the quantity of interlaces to the second group of resource blocks based at least in part on the quantity of interlaces being an even number.

15. The method of claim 13, further comprising:
allocating a first subset of interlaces of the quantity of interlaces to the first group of resource blocks and a second subset of interlaces of the quantity of interlaces to the second group of resource blocks based at least in part on the quantity of interlaces being greater than the quantity of resource block sets.

16. The method of claim 13, further comprising:
allocating a first subset of resource block sets of the quantity of resource block sets to the first group of resource blocks and a second subset of resource block sets of the quantity of resource block sets to the second group of resource blocks based at least in part on the quantity of resource block sets being an even number.

17. The method of claim 13, further comprising:
allocating a first subset of resource block sets of the quantity of resource block sets to the first group of resource blocks and a second subset of resource block sets of the quantity of resource block sets to the second group of resource blocks based at least in part on the quantity of resource block sets being greater than the quantity of interlaces.

18. The method of claim 1, further comprising:
receiving second control signaling indicating the rule, wherein the allocating is based at least in part on the second control signaling.

19. The method of claim 1, wherein transmitting the frequency division multiplexed uplink shared channel message further comprises:
transmitting the first group of resource blocks and the second group of resource blocks according to a joint rate matching scheme.

20. The method of claim 1, wherein transmitting the frequency division multiplexed uplink shared channel message further comprises:
transmitting a first repetition of a transport block in the first group of resource blocks based at least in part on a first redundancy version; and
transmitting a second repetition of the transport block in the second group of resource blocks based at least in part on a second redundancy version.

21. A method for wireless communications, comprising:
transmitting control signaling scheduling a frequency division multiplexed uplink shared channel message, the control signaling comprising a resource allocation for a plurality of resource blocks, wherein the resource allocation includes an indication of an interlace assignment and a resource block set assignment; and
receiving the frequency division multiplexed uplink shared channel message comprising a first group of resource blocks of the plurality of resource blocks and a second group of resource blocks of the plurality of resource blocks based at least in part on the interlace assignment, the resource block set assignment, and a rule, wherein the first group of resource blocks is received in accordance with a first set of transmission parameters and the second group of resource blocks is received in accordance with a second set of transmission parameters different from the first set of transmission parameters.

22. The method of claim 21, wherein the interlace assignment indicates a quantity of interlaces and the resource block set assignment indicates a quantity of resource block sets.

23. The method of claim 22, wherein:
the first group of resource blocks comprises a first subset of interlaces of the quantity of interlaces and the second group of resource blocks comprises a second subset of interlaces of the quantity of interlaces; and
both the first group of resource blocks and the second group of resource blocks are associated with one or more resource block sets indicated in the resource block set assignment.

24. The method of claim 22, wherein:
the first group of resource blocks comprises a first subset of resource block sets of the quantity of resource block sets and the second group of resource blocks comprises a second subset of resource block sets of the quantity of resource block sets; and
both the first group of resource blocks and the second group of resource blocks are associated with one or more interlaces indicated in the interlace assignment.

25. The method of claim 24, wherein the resource block set assignment indicates one or more resource blocks associated with a guard band between a first resource block set included in the first group of resource blocks and a second resource block set included in the second group of resource blocks, the first resource block set and the second resource block set being adjacent in a frequency domain.

26. The method of claim 21, further comprising:
transmitting second control signaling indicating the rule, wherein the frequency division multiplexed uplink shared channel message is received in accordance with the rule.

27. The method of claim 21, wherein receiving the frequency division multiplexed uplink shared channel message further comprises:
receiving the first group of resource blocks and the second group of resource blocks according to a joint rate matching scheme.

28. The method of claim 21, wherein receiving the frequency division multiplexed uplink shared channel message further comprises:
receiving a first repetition of a transport block in the first group of resource blocks based at least in part on a first redundancy version; and
receiving a second repetition of the transport block in the second group of resource blocks based at least in part on a second redundancy version.

29. An apparatus for wireless communications at a user equipment (UE), comprising:
a processor;
memory coupled with the processor; and
instructions stored in the memory and executable by the processor to cause the apparatus to:
receive control signaling scheduling a frequency division multiplexed uplink shared channel message, the control signaling comprising a resource allocation for a plurality of resource blocks, wherein the resource allocation includes an indication of an interlace assignment and a resource block set assignment;
allocate, according to a rule, the plurality of resource blocks into a first group of resource blocks and a second group of resource blocks based at least in part on the interlace assignment and the resource block set assignment; and
transmit the frequency division multiplexed uplink shared channel message comprising the first group of resource blocks and the second group of resource blocks based at least in part on the allocating, wherein the first group of resource blocks is transmitted in accordance with a first set of transmission parameters and the second group of resource blocks is transmitted in accordance with a second set of transmission parameters different from the first set of transmission parameters.

30. An apparatus for wireless communications, comprising:
a processor;
memory coupled with the processor; and
instructions stored in the memory and executable by the processor to cause the apparatus to:
transmit control signaling scheduling a frequency division multiplexed uplink shared channel message, the control signaling comprising a resource allocation for a plurality of resource blocks, wherein the resource allocation includes an indication of an interlace assignment and a resource block set assignment; and
receive the frequency division multiplexed uplink shared channel message comprising a first group of resource blocks of the plurality of resource blocks and a second group of resource blocks of the plurality of resource blocks based at least in part on the interlace assignment, the resource block set assignment, and a rule, wherein the first group of resource blocks is received in accordance with a first set of transmission parameters and the second group of resource blocks is received in accordance with a second set of transmission parameters different from the first set of transmission parameters.

* * * * *